United States Patent
Levene et al.

(10) Patent No.: US 7,808,509 B2
(45) Date of Patent: * Oct. 5, 2010

(54) APPARATUS AND METHODS FOR STENCILING AN IMAGE

(75) Inventors: Jonathan Levene, Somerville, MA (US); Joshua Handley, Cambridge, MA (US); Brandon Itkowitz, Natick, MA (US)

(73) Assignee: SensAble Technologies, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/054,223

(22) Filed: Mar. 24, 2008

(65) Prior Publication Data

US 2009/0027411 A1    Jan. 29, 2009

Related U.S. Application Data

(63) Continuation of application No. 10/697,174, filed on Oct. 30, 2003, now Pat. No. 7,382,378.

(51) Int. Cl.
G09G 5/02    (2006.01)

(52) U.S. Cl. .................. 345/592; 345/582; 345/589; 345/626; 345/629

(58) Field of Classification Search .......... None
See application file for complete search history.

(56) References Cited

U.S. PATENT DOCUMENTS

| | | | |
|---|---|---|---|
| 3,531,868 A | 10/1970 | Stevenson | |
| 3,920,972 A | 11/1975 | Corwin et al. | |
| 3,944,798 A | 3/1976 | Eaton | |
| 4,521,685 A | 6/1985 | Rebman | |
| 4,604,016 A | 8/1986 | Joyce | |
| 4,632,341 A | 12/1986 | Repperger et al. | |
| 4,638,798 A | 1/1987 | Shelden et al. | |
| 4,653,011 A | 3/1987 | Iwano | |
| 4,654,648 A | 3/1987 | Herrington et al. | |
| 4,655,673 A | 4/1987 | Hawkes | |
| 4,661,032 A | 4/1987 | Arai | |
| 4,670,851 A | 6/1987 | Murakami et al. | |

(Continued)

FOREIGN PATENT DOCUMENTS

EP    0915434 A2    5/1999

(Continued)

OTHER PUBLICATIONS

Photoshop Techniques 004: How to use Postscript Art as a Stencil in Photoshop, 1994, Swanson Tech Support, pp. 4.*

(Continued)

*Primary Examiner*—Kee M Tung
*Assistant Examiner*—Jwalant Amin
(74) *Attorney, Agent, or Firm*—Goodwin Procter LLP

(57) ABSTRACT

The invention provides methods of protecting selected regions of an image from subsequent modification during the operation of a graphics application. The methods allow a user to select a region of an image to protect, and to assign a level of protection to the selected region. Subsequent brush strokes in the region are then attenuated according to the assigned level of protection and blended into the image without artifacts caused by overlapping strokes. The invention also provides a method of blending individual strokes into a texture without segmentation artifacts.

11 Claims, 17 Drawing Sheets

U.S. PATENT DOCUMENTS

| | | | |
|---|---|---|---|
| 4,680,519 A | 7/1987 | Chand et al. |
| 4,686,522 A | 8/1987 | Hernandez et al. |
| 4,703,443 A | 10/1987 | Moriyasu |
| 4,729,098 A | 3/1988 | Cline et al. |
| 4,769,763 A | 9/1988 | Trieb et al. |
| 4,791,934 A | 12/1988 | Brunnett |
| 4,819,195 A | 4/1989 | Bell et al. |
| 4,839,838 A | 6/1989 | LaBiche et al. |
| 4,853,874 A | 8/1989 | Iwamoto et al. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A | 11/1990 | Haacke et al. |
| 4,982,504 A | 1/1991 | Söderberg et al. |
| 4,988,981 A | 1/1991 | Zimmerman et al. |
| 5,040,306 A | 8/1991 | McMurtry et al. |
| 5,053,975 A | 10/1991 | Tsuchihashi et al. |
| 5,072,361 A | 12/1991 | Davis et al. |
| 5,088,046 A | 2/1992 | McMurtry |
| 5,088,055 A | 2/1992 | Oyama |
| 5,105,367 A | 4/1992 | Tsuchihashi et al. |
| 5,131,844 A | 7/1992 | Marinaccio et al. |
| 5,185,561 A | 2/1993 | Good et al. |
| 5,189,806 A | 3/1993 | McMurtry et al. |
| 5,204,824 A | 4/1993 | Fujimaki |
| 5,237,647 A | 8/1993 | Roberts et al. |
| 5,255,211 A | 10/1993 | Redmond |
| 5,333,257 A | 7/1994 | Merrill et al. |
| 5,354,162 A | 10/1994 | Burdea et al. |
| 5,389,865 A | 2/1995 | Jacobus et al. |
| 5,396,265 A | 3/1995 | Ulrich et al. |
| 5,446,834 A | 8/1995 | Deering |
| 5,459,382 A | 10/1995 | Jacobus et al. |
| 5,482,051 A | 1/1996 | Reddy et al. |
| 5,497,452 A | 3/1996 | Shimizu et al. |
| 5,506,785 A | 4/1996 | Blank et al. |
| 5,515,078 A | 5/1996 | Greschler et al. |
| 5,555,894 A | 9/1996 | Doyama et al. |
| 5,587,937 A | 12/1996 | Massie et al. |
| 5,623,642 A | 4/1997 | Katz et al. |
| 5,625,576 A | 4/1997 | Massie et al. |
| 5,629,594 A | 5/1997 | Jacobus et al. |
| 5,659,493 A | 8/1997 | Kiridena et al. |
| 5,666,138 A | 9/1997 | Culver |
| 5,687,304 A | 11/1997 | Kiss |
| 5,691,898 A | 11/1997 | Rosenberg et al. |
| 5,694,013 A | 12/1997 | Stewart et al. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,751,289 A | 5/1998 | Myers |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |
| 5,821,920 A | 10/1998 | Rosenberg et al. |
| 5,825,308 A | 10/1998 | Rosenberg |
| 5,828,197 A | 10/1998 | Martin et al. |
| 5,831,408 A | 11/1998 | Jacobus et al. |
| 5,844,392 A | 12/1998 | Peurach et al. |
| 5,847,956 A | 12/1998 | Bronfeld et al. |
| 5,859,934 A | 1/1999 | Green |
| 5,872,438 A | 2/1999 | Roston |
| 5,873,106 A | 2/1999 | Joseph |
| 5,881,178 A | 3/1999 | Tsykalov et al. |
| 5,882,206 A | 3/1999 | Gillio |
| 5,889,670 A | 3/1999 | Schuler et al. |
| 5,898,599 A | 4/1999 | Massie et al. |
| 5,907,487 A | 5/1999 | Rosenberg et al. |
| 5,913,727 A | 6/1999 | Ahdoot |
| 5,956,484 A | 9/1999 | Rosenberg et al. |
| 5,963,212 A | 10/1999 | Bakalash |
| 5,973,678 A | 10/1999 | Stewart et al. |
| 5,988,862 A | 11/1999 | Kacyra et al. |
| 6,040,840 A | 3/2000 | Koshiba et al. |
| 6,061,004 A | 5/2000 | Rosenberg |
| 6,084,587 A | 7/2000 | Tarr et al. |
| 6,111,577 A | 8/2000 | Zilles et al. |
| 6,131,097 A | 10/2000 | Peurah et al. |
| 6,191,796 B1 | 2/2001 | Tarr |
| 6,211,848 B1 | 4/2001 | Plesniak et al. |
| 6,219,032 B1 | 4/2001 | Rosenberg et al. |
| 6,226,003 B1 | 5/2001 | Akeley |
| 6,308,144 B1 | 10/2001 | Bronfeld et al. |
| 6,337,678 B1 | 1/2002 | Fish |
| 6,342,880 B2 | 1/2002 | Rosenberg et al. |
| 6,369,834 B1 | 4/2002 | Zilles et al. |
| 6,405,158 B1 | 6/2002 | Massie et al. |
| 6,417,638 B1 | 7/2002 | Guy et al. |
| 6,421,048 B1 | 7/2002 | Shih et al. |
| 6,552,722 B1 | 4/2003 | Shih et al. |
| 6,608,631 B1 | 8/2003 | Milliron |
| 6,671,651 B2 | 12/2003 | Goodwin et al. |
| 6,707,458 B1 | 3/2004 | Leather et al. |
| 6,792,398 B1 | 9/2004 | Handley et al. |
| 6,831,640 B2 | 12/2004 | Shih et al. |
| 6,853,965 B2 | 2/2005 | Massie et al. |
| 6,867,770 B2 | 3/2005 | Payne |
| 6,879,315 B2 | 4/2005 | Guy et al. |
| 2002/0089500 A1 | 7/2002 | Jennings et al. |
| 2002/0154132 A1 | 10/2002 | Dumesny et al. |
| 2003/0048277 A1 | 3/2003 | Maillot et al. |
| 2003/0191554 A1 | 10/2003 | Russell et al. |
| 2003/0234781 A1 | 12/2003 | Laidlaw et al. |
| 2004/0233196 A1 | 11/2004 | Hertzmann |
| 2005/0001831 A1 | 1/2005 | Shih et al. |
| 2005/0060130 A1 | 3/2005 | Shapiro et al. |
| 2005/0062738 A1 | 3/2005 | Handley et al. |
| 2005/0093821 A1 | 5/2005 | Massie et al. |
| 2005/0128210 A1 | 6/2005 | Berger |
| 2005/0128211 A1 | 6/2005 | Berger et al. |
| 2005/0168460 A1 | 8/2005 | Razdan et al. |

FOREIGN PATENT DOCUMENTS

| | | |
|---|---|---|
| GB | 2389764 | 12/2003 |
| GB | 2410351 | 7/2005 |
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |

| WO | WO 99/10872 | 3/1999 |

OTHER PUBLICATIONS

Author: Adobe Press, Title: Adobe Photoshop 7.0 Classroom in a.Book, Date: Jun. 25, 2002, ISBN: 0-321-11562-7, p. 1-1,131-137, 167,202-203,220-225, 229-231,236-252.*
US 5,903,456, 5/1999, Schena et al. (withdrawn).
Adachi, "Touch and Trace on the Free-Form Surface of Virtual Object", Proceedings of IEEE Virtual Reality Annual International Symposium, Sep. 18-22, 1993, Seattle WA, pp. 162-168.
Agrawala et al., "3D Painting on Scanned Surfaces", Stanford University, 1995, pp. 145-150.
Barr, "Global and Local Deformations of Solid Primitives", Computer Graphics; vol. 18, No. 3, pp. 21-30 (Jul. 1984).
Blinn, "Simulation of Wrinkled Surfaces," Computer Graphics, vol. 12-3, Aug. 1978, pp. 286-292.
Brooks et al., "Project GROPE—Haptic Displays for Scientific Visualization," Computer Graphics, vol. 24, No. 4, Aug. 1990, pp. 177-185.
Decaudin, "Geometric Deformation by Merging a 3D-Object with a Simple Shape," Graphics Interface '96 Proceedings (Toronto, Canada), 6 pgs. (May 21-24, 1996).
Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.
Elhajj et al., "Supermedia-Enhanced Internet-Based Telerobotics," Proceedings of the IEEE, vol. 91, No. 3, pp. 396-421 (Mar. 2003).
Foskey, M. et al., "ArtNova: Touch-Enabled 3D Model Design," IEEE Virtual Reality 2002, pp. 119-126 (Mar. 2002).
Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).
Galyean, "Sculpting: An Interactive Volumetric Modeling Technique," Computer Graphics (SIGGRAPH '91 Las Vegas), vol. 25, No. 4, pp. 267-274 (Jul. 1991).
Gibson, "Beyond Volume Rendering: Visualization, Haptic Exploration, and Physical Modeling of Voxel-Based Objects," 1995 Mitsubishi Electric Research Laboratories, Inc., 1995, 6$^{th}$ Eurographics Workshop on Visualization in Scientific Computing, pp. 1-14.
Hashimoto et al., "Dynamic Force Simulator for Force Feedback Human-Machine Interaction", IEEE, Sep. 1993, pp. 209-215.
Hirata et al., "3-Dimensional Interface Device for Virtual Work Space," Proceedings of the 1992 IEEE, Jul. 7-10, 1992, pp. 889-896.
Hirota et al., "Providing Force Feedback in Virtual Environments", IEEE, Sep. 1995, pp. 22-30.
Hirota et al., "Development of Surface Display," Proceedings of the Virtual Reality Annual International Symposium (Seattle), pp. 256-262 (Sep. 18-23, 1993).
Immersion Corporation, "Laparoscopic Impulse Engine: A New Force Feedback Surgical Simulation Tool", Immersion Corporation, 1995. http://www.immerse.com/wwwpages/laplEpg.htm.
Immersion Corporation, "The Impulse Engine", 1 page, Immersion Corporation, 1996.
Immersion Corporation, "Virtual Laparoscopic Interface", Immersion Corporation, 1995, 1 pg.
Ishii et al., "A 3D Interface Device with Force Feedback: A Virtual Work Space for Pick-and-Place Tasks", IEEE, Sep. 1993, pp. 331-335.
Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.
Kotoku et al., "A Force Display Algorithm for Virtual Environments," SICE, pp. 347-355, 1992.
Luo et al., "Networked Intelligent Robots Through the Internet: Issues and Opportunities," Proceedings of the IEEE, vol. 91, No. 3, pp. 371-382 (Mar. 2003).

Marcus et al., "EXOS Research on Master Controllers for Robotic Devices," Fifth Annual Workshop on Space Operations Applications and Research (SOAR '91) pp. 238-245, Jul. 1991.
Massie, "Design of a Three Degree of Freedom Force-Reflecting Haptic Interface", Massachusetts Institute of Technology; Bachelor of Science in Electrical Science and Engineering Thesis, May, 1993, pp. 1-38.
Massie, "Initial Haptic Explorations with the Phantom: Virtual Touch Through Point Interaction", Massachusetts Institute of Technology Master of Science Thesis, Feb. 1996, pp. 1-49. (not admitted as prior art).
McAffee et al, "Teleoperator Subsystem/Telerobot Demonstrator," Force Reflecting Hand Controller Equipment Manual, Jet Propulsion Laboratory, Jan. 1988.
Millman et al., "A System for the Implementation and Kinesthetic Display of Virtual Environments," Telemanipulator Technology, Proceedings of 1992 SPIE, vol. 1833, pp. 49-56.
Minsky et al., "Feeling and Seeing: Issues in Force Display," Computer Graphics, vol. 24, No. 2, Mar. 1990, pp. 235-270.
Minsky, "Computational Haptics: The Sandpaper System for Synthesizing Texture for a Force-Feedback Display," Massachusetts Institute of Technology Ph.D. Thesis, Jun. 1995, pp. 1-217.
Morgenbesser, "Force Shading for Shape Perception in Haptic Virtual Environments", Massachusetts Institute of Technology Master of Engineering Thesis, Sep. 1995, pp. 1-77.
Oboe, "Force-Reflecting Teleoperation Over the Internet: The JBIT Project," Proceedings of the IEEE, vol. 91, No. 3, pp. 449-462 (Mar. 2003).
Photoshop, Lesson 4: Layers, webpage downloaded Sep. 12, 2003, http://iit.bloomu.edu/vthc/Photoshop/Basics/layers.htm.
Photoshop, Lesson 8: Brightness & Contrast, webpage downloaded Sep. 12, 2003, http://iit.bloomu.edu/vthc/Photoshop/enhancing/brightness&contrast.htm.
Photoshop, Lesson 9: Hue & Saturation, webpage downloaded Sep. 12, 2003, http://iit.bloomu.edu/vthc/Photoshop/enhancing/hue&saturation.htm.
Photoshop, Lesson 7: Color Balance, webpage downloaded Sep. 12, 2003, http://iit.bloomu.edu/vthc/Photoshop/enhancing/colorbalance.htm.
Photoshop, Lesson 12: Blur, Sharpen & Smudge, webpage downloaded Sep. 12, 2003, http://iit.bloomu.edu/vthc/Photoshop/enhancing/blurring.htm.
Photoshop, Lesson 14: Selection Tools, webpage downloaded Sep. 12, 2003, http://iit.bloomu.edu/vthc/Photoshop/blending/selectiontools.htm.
Photoshop, Lesson 18: Opacity, webpage downloaded Sep. 12, 2003, http://iit.bloomu.edu/vthc/Photoshop/SpecialEffects/opacity.htm.
Photoshop, Lesson 19: Color Selection, webpage downloaded Sep. 12, 2003, http://iit.bloomu.edu/vthc/Photoshop/drawing/colorpicker.htm.
Photoshop, Lesson 21: Paint Tools, webpage downloaded Sep. 12, 2003, http://iit.bloomu.edu/vthc/Photoshop/drawing/painttools.htm.
Photoshop, Lesson 22: Vector Shapes, webpage downloaded Sep. 12, 2003, http://iit.bloomu.edu/vthc/Photoshop/drawing/vectorshapes.htm.
Photoshop, Lesson 23: Gradients, webpage downloaded Sep. 12, 2003, http://iit.bloomu.edu/vthc/Photoshop/drawing/gradients.htm.
Photoshop Techniques 004: How to use Postscript Art as a Stencil in Photoshop, 1994, Swanson Tech Support.
Nagel, "A Closer Look: Photoshop's New Paint Engine," Creative Mac Features, Mar. 7, 2002, http://www.creativemac.com/2002/03_mar/features/ps7dynamics12.htm.
3D Animation Workshop: Lesson 39: Softimage—NURBS Blending, webpage downloaded Jul. 29, 2003, http://www.webreference.com/3d/lesson39.
Porter et al., "Compositing Digital Images", Computer Graphics, vol. 18. No. 3, Jul. 1984, pp. 253-259.
Safaric et al., "Control of Robot Arm with Virtual Environment via the Internet," Proceedings of the IEEE, vol. 91, No. 3, pp. 422-429 (Mar. 2003).
Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

Salisbury et al., "Haptic Rendering of Surfaces Defined by Implicit Functions," Proceedings of the ASME Dynamic Systems and Control Division, 1997 ASME International Mechanical Engineering Congress and Exposition, 1997.

SensAble Technologies, Inc., "Phantom Haptic Interface," 1996, Cambridge, MA (6 pgs).

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Swarup, "Haptic Interaction with Deformable Objects Using Real-Time Dynamic Simulation", Massachusetts Institute of Technology, Sep. 1995, pp. 1-83.

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

Terzopoulos et al.; "Elastically Deformable Models"; Computer Graphics, vol. 21, No. 4, pp. 205-214 (Jul. 1987).

Tyson, How stuffworks, "How AGP Work", http://computer.howstuffworks.com/agp.htm/printalbe, printed Jul. 15, 2003.

University of Michigan Virtual Reality Laboratory, "Revival of the Virtual Lathe," http://www-vrl.umich.edu/sel_prj/lathe/, (Dec. 20, 2002).

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

* cited by examiner

APPARATUS AND METHODS FOR STENCILING AN IMAGE

RELATED APPLICATIONS

This application is related to the commonly-owned U.S. patent application entitled, "Apparatus and Methods for Texture Mapping," by Levene et al., filed Jun. 6, 2006, under U.S. patent application Ser. No. 11/474,920, which claims priority to U.S. patent application Ser. No. 10/697,548, filed on Oct. 30, 2003, the disclosures of which are hereby incorporated by reference in their entirety. The present application is a continuation application of co-pending U.S. patent application Ser. No. 10/697,174, filed Oct. 30, 2003, the disclosure of which is hereby incorporated by reference in its entirety.

FIELD OF THE INVENTION

This invention relates generally to computer graphics applications. More particularly, in certain embodiments, the invention relates to image editing functions in computer graphics applications.

BACKGROUND OF THE INVENTION

Certain computer graphics applications include a stenciling function for protecting part of an image from subsequent paint strokes. A stenciling function allows a user to select a region of the image to protect, such that subsequent paint strokes falling within the selected region are not blended into the image.

A stenciling function may also allow a user to apply a partial mask to a selected region, such that a subsequent paint stroke falling within the selected region is only partially blended into the image. For example, a partial mask may be used along the edges of a full mask in order to provide a smooth transition between masked and unmasked portions of the stenciled image.

A partial mask may be applied for a single paint stroke falling within a selected region by reducing the intensity of the paint stroke prior to blending the paint stroke into the image. Partial masks that are available in current graphics applications are of limited value where paint strokes overlap. Overlapping paint strokes within a partially masked region may result in a blending of more color into the underlying image than is desired.

Paint strokes within a partially stenciled region are blended into an image one by one, as soon as each paint stroke is executed. The color contributed by the original layer appears to diminish as new layers of paint are blended into the partially-stenciled region. That is, the opacity of the original layer decreases as the image is layered over with new paint.

It is not possible for a user to specify that an initial version of a selected region of an image be maintained at a specified opacity in any subsequent composite. This is because the image is modified after each stroke in order to maintain real-time interactivity with the user, and previous brush strokes are not accounted for in the attenuation and blending of subsequent, overlapping strokes.

Similarly, overlapping erase strokes within a partially-masked region may result in a removal of more color than is desired by the user, since overlapping erase strokes in the selected region will eventually reduce the opacity of the original layer below the desired minimum.

Furthermore, current methods of blending individual paint strokes into an image may result in undesired artifacts. An individual paint stroke is generally divided into a series of stroke segments that are separately blended into an image. Overlapping portions at the ends of segments of an individual paint stroke are blended twice, causing undesired artifacts.

There exists a general need for more accurate and more robust stenciling methods in computer graphics applications. More specifically, there exists a need for stenciling methods that allow a user to specify that a selected region not change more than a specified amount during subsequent editing.

SUMMARY OF THE INVENTION

The invention provides methods for protecting a selected region of an image from subsequent editing. More specifically, the invention provides stenciling methods that allow a user to more accurately control the editing of an image by specifying a maximum amount by which selected portions of the image are allowed to change over the course of a series of brush strokes.

The methods involve protecting an image using a first texture and a second texture, rather than a single texture alone. The first texture includes pixels with values indicating levels of protection to be applied to corresponding pixels of the protected image. For example, the first texture may be a map of values indicating one or more regions of the image to be protected from editing by subsequent paint strokes. The level of protection may be from 0% to 100%, where 0% indicates no protection from subsequent edits, and 100% indicates full protection from subsequent edits. A level between 0% and 100% indicates partial protection, and may correspond to a minimum opacity above which to maintain at least a portion of the protected region throughout the application of subsequent brush strokes.

Graphical input is directed into a second texture, rather than being directly blended into the protected image. In a preferred embodiment, the second texture accumulates graphical input as long as the stencil remains active. The accumulated graphical input may represent one or more brush strokes performed by a user. Values of the second texture are modified using corresponding first texture values, and are blended into the protected image. The modification and blending of the accumulated data may be performed substantially at the same time, as in a consolidated operation.

Because the second texture is able to accumulate graphical data from more than one brush stroke, methods of the invention allow a user to maintain an initial version, or initial layer, of a selected region of an image at a specified opacity in any subsequent composite, regardless of overlapping brush strokes within the selected region. This is done by accumulating graphical input representing one or more brush strokes in the second texture, and by subsequently blending the pixels of the second texture, modified by first texture values, into the protected image. The blending is performed, for example, using a compositing function.

Overlapping portions may result from multiple overlapping brush strokes and/or from a single brush stroke that overlaps itself. Despite the presence of any overlapping portion(s), and despite the number of brush strokes applied following activation of the stencil, methods of the invention can prevent the opacity of an initial version, or initial layer, of the selected region(s) from decreasing below a specified minimum in any subsequent composite.

The interactivity of the user's image editing experience may be preserved by use of a display image. In one embodiment, pixels of the protected image are copied directly into a display image, while pixels of the second texture are modified according to the first texture and blended into the display image. The modified pixels of the second texture may be blended into the display image, for example, by compositing the second texture over the display image.

User interactivity is preserved by modifying pixels of the second texture and blending the modified pixels into the display image on a pixel-by-pixel basis. In this way, the user sees the resulting image emerge, subject to the user-specified protection, as the user continues to apply brush strokes.

The display image can reflect real-time user brush strokes, as well as preserve a minimum opacity of the original image layer within a protected region, regardless of the number of brush strokes that follow. This is because, in a preferred embodiment, each update of the display image is performed by: (1) re-copying pixel values of the original protected image layer into the display image pixels, and then (2) compositing the modified second texture pixels with the display image pixels. The display image may be updated at a rate of up to about 30 times per second, or more, depending on the complexity of the image and the computational speed for graphical rendering. The update rate may be less for more complex images or for slower machines—for example, from about 10 times per second to about 20 times per second.

The use of a display image is optional. Whether or not a display image is used, methods of the invention can preserve a minimum opacity of the original image layer within a protected region by accumulating graphical input in the second texture, and by subsequently blending pixels of the second texture, modified by first texture values, into the protected image. The protected image is not affected by the accumulated graphical input until the final blending step. Thus, in one embodiment, after all the graphical input representing a plurality of brush strokes are accumulated and modified, the second texture is blended into the protected original image.

The user may provide one or more signals indicating the beginning and/or ending of the period of time in which brush strokes are accumulated in the second texture. The user provides a first signal, such as a button click, to indicate the beginning of the application of a stencil. Alternatively, the stencil may self-activate once the user defines the first texture. The step of defining the first texture may include indicating: (1) one or more regions of an image to be protected; and/or (2) one or more levels of protection to apply within the one or more regions.

Once the stencil is active, graphical input representing brush strokes by the user are directed into the second texture. When the user has completed one or more brush strokes, the user may provide a second signal to deactivate the stencil. In one embodiment, once the stencil is deactivated, the second texture, modified by the first texture, is blended into the protected image.

Real-time display of erase strokes requires modification of paint strokes applied both before and after activation of the stencil. Generally, the second texture contains data from paint strokes applied after activation of the stencil, but not before. Therefore, one embodiment of the invention includes the step of modifying a value of one or more pixels of the protected image prior to copying pixels of the protected image into the display image and compositing the modified second texture pixels with the display image pixels. Pixel values of the protected image are modified according to the level(s) of protection indicated in the first texture.

In one embodiment, a minimum opacity of an original image layer may be preserved despite repeated erase strokes within the protected region, where overlapping erase strokes result in the attenuation of a pixel value of the protected image down to a minimum value, but no further. The minimum value is determined from the protection level of that pixel as indicated in the first texture. In cases where pixels are represented by RGBA quadruples, the first texture may be used to derive a minimum alpha channel value below which the pixel values of the protected image are not allowed to fall.

Thus, the display methods discussed herein work where a user performs paint strokes, erase strokes, or both paint and erase strokes, while the stencil remains active. Additionally, the display methods preserve the interactivity experienced by the user during the editing process, while maintaining the protection offered by the stenciling methods described herein.

Methods of the invention involve the modification of paint colors of images and/or textures, as well as the blending of paint colors between two or more images and/or textures. For example, in one embodiment, pixels of the second texture are modified using the first texture, where the first texture is a map of values indicating protection levels for the image and the second texture contains accumulated graphical input. A pixel of the second texture may be modified by attenuating its color value according to the protection level in the first texture corresponding to that pixel.

Blending of images and/or textures may be performed using a compositing operation. For example, in one embodiment, pixels of the second texture are blended into the protected image. This may be done by performing a compositing operation, such as an overlay operation in RGBA colorspace, between the modified values of the second texture and the protected image.

In addition to the stenciling methods summarized above, the invention provides a blending method that prevents double-blending of overlapping portions of segments of an individual brush stroke, thereby avoiding undesired artifacts at the segment ends. An individual brush stroke is typically divided into a series of stroke segments that are separately blended into a target image. For example, each segment of an individual brush stroke may be represented with a pillbox shape. The blending method avoids higher intensities in the circular regions where the ends of the pillboxes overlap.

The blending method uses a scratch texture to describe brush characteristics, for example, the scratch texture may contain intensity values that reflect brush size and/or edge effects. By assigning a new pixel value to the scratch texture only if it exceeds the existing value at that pixel, the double-blending artifact is avoided. In one embodiment, the blending method includes the steps of: (1) receiving brush stroke data from a graphical user interface; (2) for each of a plurality of pixels of a scratch texture, comparing a received pixel value to a value previously written at the corresponding pixel of the scratch texture and assigning the received value to the corresponding pixel of the scratch texture only if it exceeds the existing value; and (3) blending the scratch texture into the target image. In one embodiment, the blending step is performed substantially upon completion of the performance of the paint stroke by the user.

The blending method is compatible with use of a scratch texture for representing a transition region along one or more edges of a brush stroke. The "falloff" of a brush stroke at the edges of the brush may be captured in the scratch texture. Here, a pixel value in the transition region may be determined as a function of a distance of the pixel from the center of the brush stroke.

The use of a scratch texture to characterize an individual brush stroke is compatible with the stenciling methods summarized above. For example, the graphical input used in the stenciling methods summarized above may include a scratch texture representing a brush stroke. The stenciling method may include blending the scratch texture into the second texture, wherein the second texture accumulates one or more brush strokes performed while the stencil is active. The brush stroke may include a falloff region, which is accounted for in the scratch texture. In one embodiment, the scratch texture includes intensity values which correspond to a transition region at the edges of the brush stroke.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
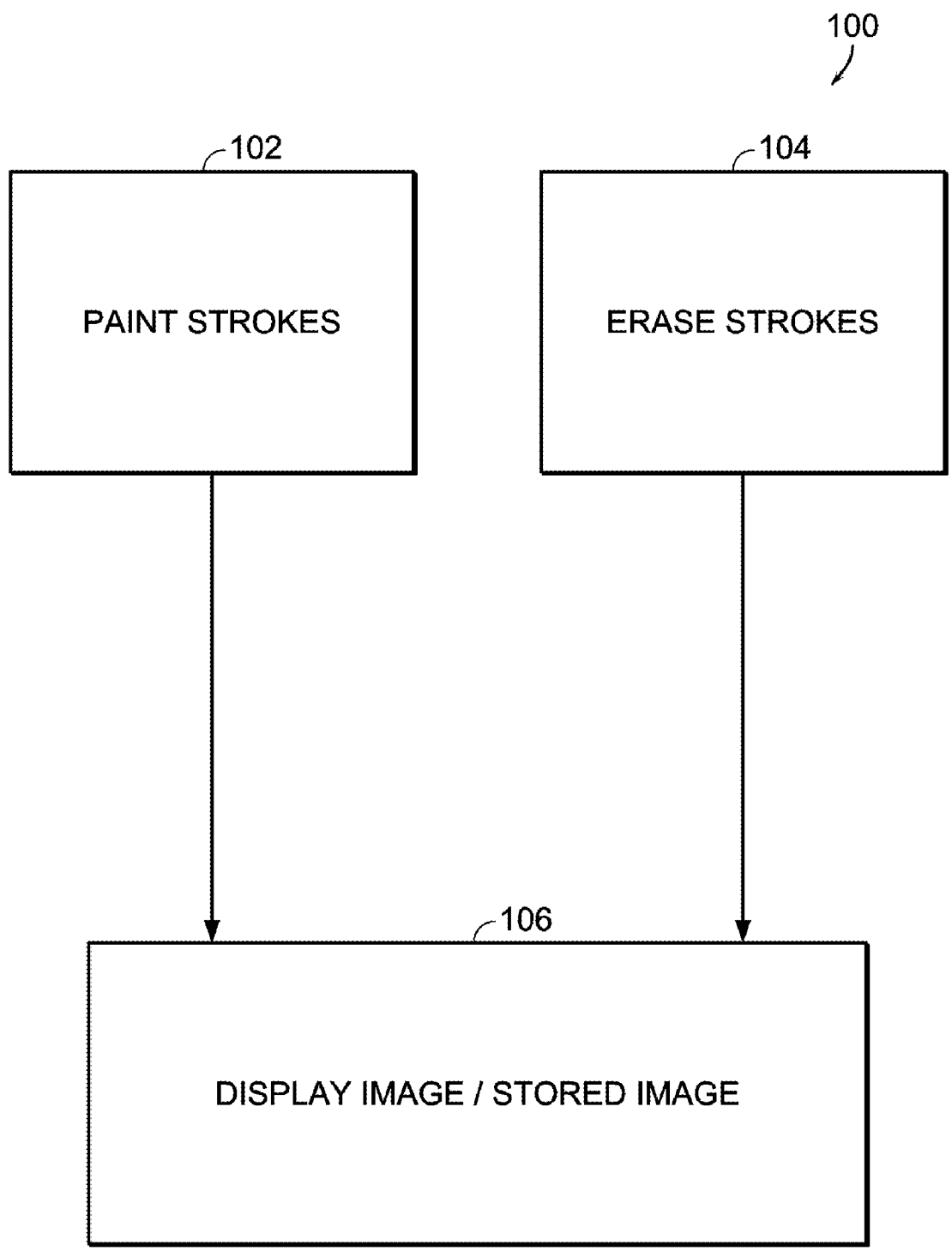
FIG. 1 is a block diagram featuring a method of blending paint strokes and erase strokes into an image prior to activation of a stencil or following deactivation of a stencil, according to an illustrative embodiment of the invention.

In general, the invention relates to methods for protecting a selected region of an image from subsequent editing. More specifically, the invention provides methods of specifying a maximum amount by which one or more selected portions of an image are allowed to change during the course of a series of brush strokes.

As used herein, a brush stroke is an operation performed on one or more pixels of an image. Brush strokes include, for example, paint strokes, erase strokes, pencil strokes, pen strokes, lines, characters, and text.

Each brush stroke is divided into segments that link positions of a graphical interface device, such as a stylus or other painting tool. The positions are recorded at successive frames as the user moves the graphical user interface device in real space, and, preferably, while the user views a graphical rendering of the image upon which the user is applying the brush stroke. Each brush stroke may be represented as having a skeleton made up of a series of straight line segments connecting the recorded positions of the graphical user interface device. Each individual segment of a brush stroke may be represented, for example, by a pillbox having a specified width about the stroke skeleton and having curved, semicircular ends. Alternately, each segment may be represented by another shape having a fixed or variable width along the length of the stroke segment and having a given shape at the end of the stroke segment.

A user may interactively determine the manner in which a brush stroke operates on a collection of pixels of an image, as in the performance of a paint or erase stroke, using a graphical interface device. Alternatively, application of a brush stroke may be largely non-interactive, executed with minimal user input. Thus, brush strokes may include, for example, batch deletions, batch pastes, and flood fills. The pixels on which a brush stroke operates may be either contiguous or non-contiguous. The graphical interface device may be a two dimensional input device, such as a mouse, a pen, a graphics tablet. Alternatively, the graphical interface device may be a 3, 4, 5, 6, or higher-degree-of-freedom device. The user may use the graphical interface device to apply brush strokes onto a two-dimensional surface. The user may also use the graphical interface device to apply brush strokes onto the surface of a three-dimensional virtual object. The graphical interface device may be a haptic interface device, compatible with a system for haptically rendering a virtual object, where the haptic interface device provides force feedback to the user in response to a position of the user within a virtual environment. The virtual object may be rendered both graphically and haptically.

The invention protects a selected portion of a target image by using two textures, rather than a single texture alone. A texture is an array of values. For example, a texture may be a two-dimensional array of values, wherein each value corresponds to a location within a two-dimensional region. Texture values may define visual attributes of an image, or may represent any other characteristic. For example, a texture may contain values representing levels of protection to be applied to corresponding pixels of a protected image. A texture may be displayed as an image, where texture values provide visual attributes applicable to corresponding positions. A texture may be stored, for example, as a file or other collection of data. The terms texel and pixel are used interchangeably herein. The term texel generally refers to a unit of a texture, and the term pixel generally refers to a unit of either a texture or an image.

Pixel values and/or texel values include values of any bit depth, where bit depth generally ranges from 1 to 64 bits per pixel. Pixel values include grayspace values, RGB colorspace values, RGBA colorspace values, or any other colorspace values, such as HSL, HSV, CMY, CMYK, CIE Lab, and R-Y/B-Y. Preferred methods of the invention are performed using 24-bit, RGBA colorspace pixels, although any bit depth and/or colorspace format may be used.

In order to activate or deactivate a stenciling feature of the invention, a user may provide a signal. The signal may be a mouse click, a switch toggle, a speech command, a button press, a key press, a touch-sensitive pad press, a button release, or any other indication performed by the user. In order to deactivate a stenciling feature after it has been activated, a user may repeat the signal provided for activation or may provide a different signal. Alternatively, the stencil may self-activate and/or self-deactivate.

A user may use painting and erasing features of a computer graphics application to create and/or edit an image. In a normal operation mode of a computer graphics application, the paint and erase strokes are blended into an image that is stored and/or displayed. FIG. 1 is a block diagram 100 featuring a method of blending paint strokes 102 and erase strokes 104 into an image 106. For example, both paint strokes 102 and erase strokes 104 operate directly on a single image, which serves as both a stored image and a displayed image 106. The displayed image may simply be a graphical rendering of the stored image, as it appears on a CRT screen or other computer screen. Alternately, a separate image used for display may be maintained by copying a stored image into the displayed image at various frames of time during an editing process.

Figure 2:
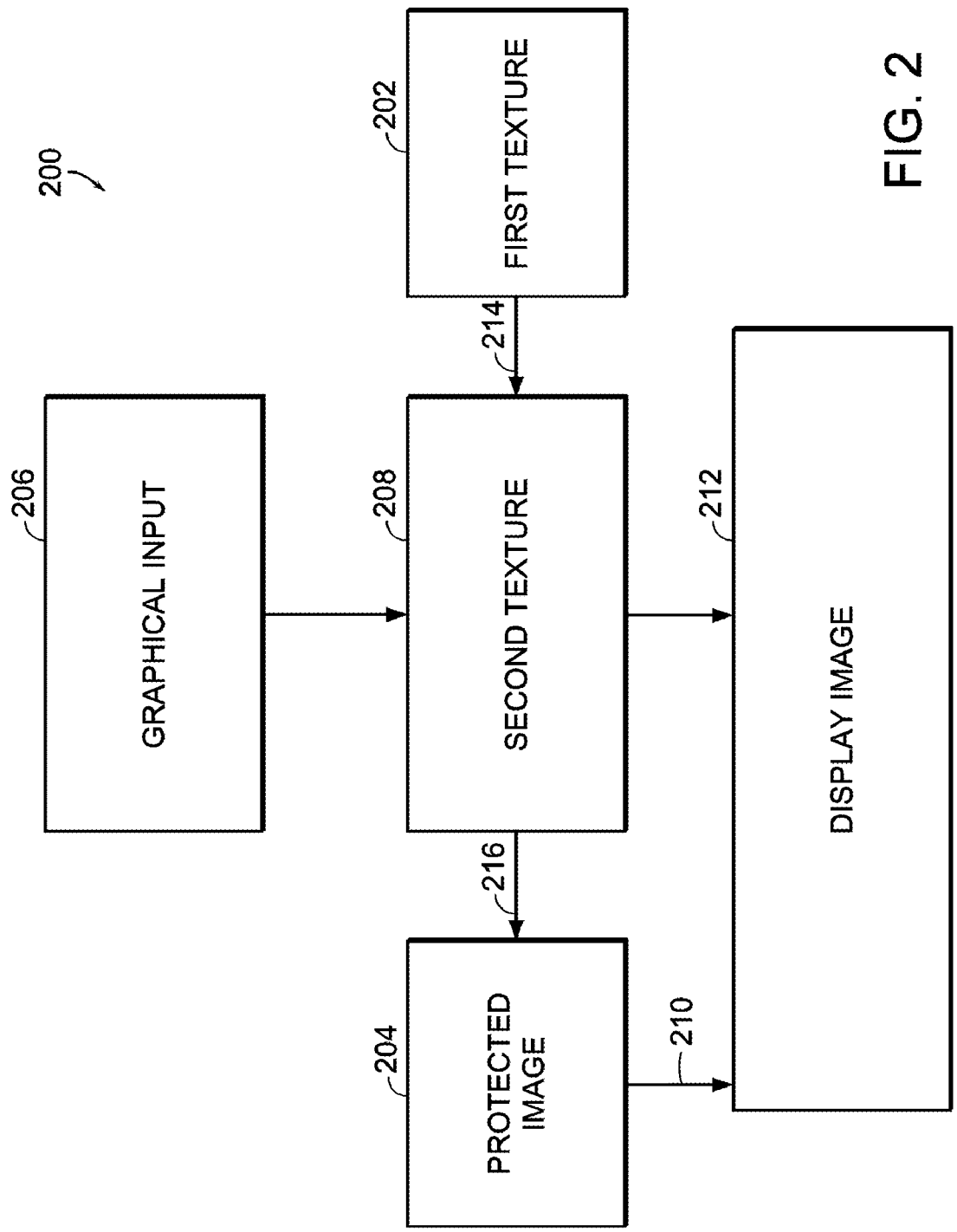
FIG. 2 is a schematic diagram illustrating a method for blending graphical input into an image while wholly or partially protecting one or more selected regions of the image from paint edits, according to an illustrative embodiment of the invention.

A user may switch from a normal operation mode to a stenciling mode by activating a stenciling feature. Upon deactivation of the stenciling feature, the normal operation mode of FIG. 1 is resumed. FIG. 2 illustrates a stenciling method of the invention, further described in the block diagram 300 of FIG. 3.

Figure 3:
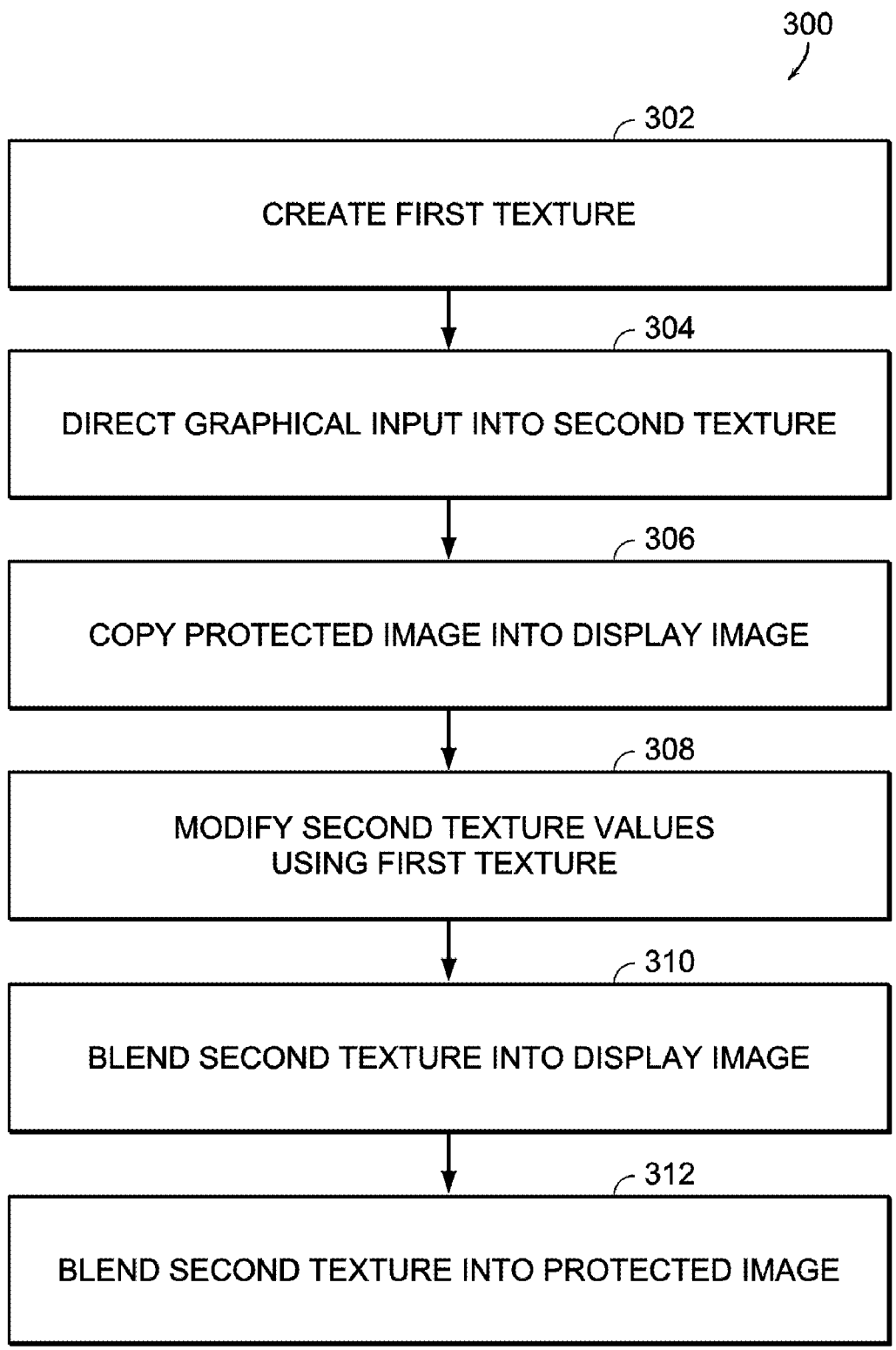
FIG. 3 is a block diagram featuring the stenciling method illustrated in FIG. 2, according to an illustrative embodiment of the invention.

In step 302 of FIG. 3, the stenciling method creates a first texture based on user input provided either before or upon activation of the stenciling feature. The first texture is illustrated at reference 202 of FIG. 2. The first texture 202 includes pixels with values indicating levels of protection to be applied to corresponding pixels of the protected image, shown at reference 204 of FIG. 2. The user may select these pixels, for example, by using a graphical interface device to draw a boundary within which (or outside of which) to apply one or more protection levels. The user may specify a single protection level, multiple discrete protection levels, or ranges/gradients of protection levels for application in the selected region.

In step 304 of FIG. 3, the stenciling method redirects graphical input from the stored/protected image into a second texture. Accordingly, FIG. 2 shows graphical input 206 that is directed into a second texture 208. The graphical input 206 may represent one or more brush strokes, such as paint and/or erase strokes. The second texture accumulates graphical data from the user brush strokes performed throughout the time that the stenciling feature remains active. The protected image 204 is not modified as long as the stencil remains active and the second texture continues to accumulate graphical input.

Since the protected image 204 is not modified while the stencil is active, simply displaying the protected image 204 does not provide real-time feedback for the user. This is because the protected image does not reflect the brush strokes performed by the user while the stencil is active. Thus, a display image is needed that is separate from the protected image 204. The stenciling method of FIG. 3 creates a display image by first copying the protected image in step 306. Step 306 is illustrated in FIG. 2 by arrow 210 extending from the protected image 204 to the display image 212. Then, step 308 of FIG. 3 modifies the second texture values using the first texture. Step 308 is illustrated in FIG. 2 by arrow 214 extending from the first texture 202 to the second texture 208. Step 308 may involve attenuating a color intensity value at a pixel of the second texture according to a value of the first texture corresponding to that pixel. This is described in more detail elsewhere herein. Step 310 of FIG. 3 blends the modified second texture pixels into the display image by performing a compositing operation, for example, by performing an overlay operation in which pixel values copied from the protected image are combined with corresponding pixel values of the modified second texture. Steps 308 and 310 may be performed substantially simultaneously, as in a consolidated operation.

The display image can reflect real-time user brush strokes while the stencil remains active, as well as preserve protection level(s) specified by the first texture, regardless of the number of brush strokes performed. This is because, in a preferred embodiment, each update of the display image is performed by re-copying pixel values of the original protected image 204 into the display image pixels according to step 306, and then compositing the current modified second texture pixels with the display image pixels according to step 310. The display image is updated at a rate that provides sufficient real-time user feedback, for example, at rates of up to about 30 times per second or more. Finally, step 312 directs that, upon deactivation of the stencil by the user, the second texture, modified by the first texture, is blended into the protected image 204. Step 312 is illustrated in FIG. 2 by arrow 216 from the second texture 208 to the protected image 204.

Figure 4A:
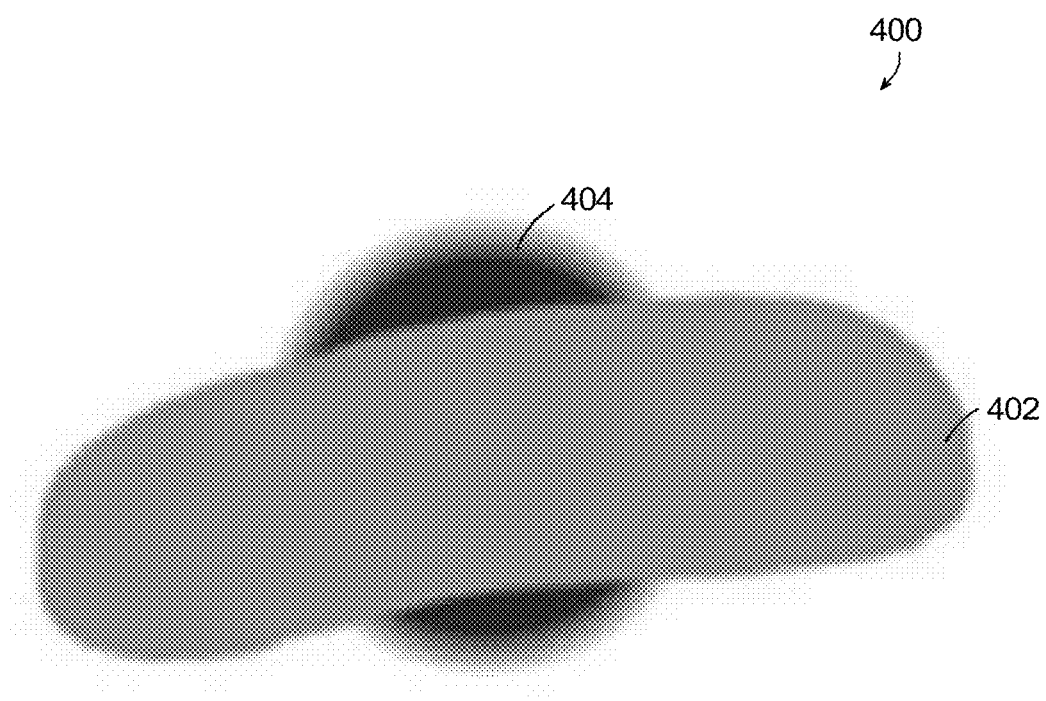
FIG. 4A is a schematic diagram illustrating the result of applying orange paint strokes over a circular blue stroke without a stencil.
Figure 4B:
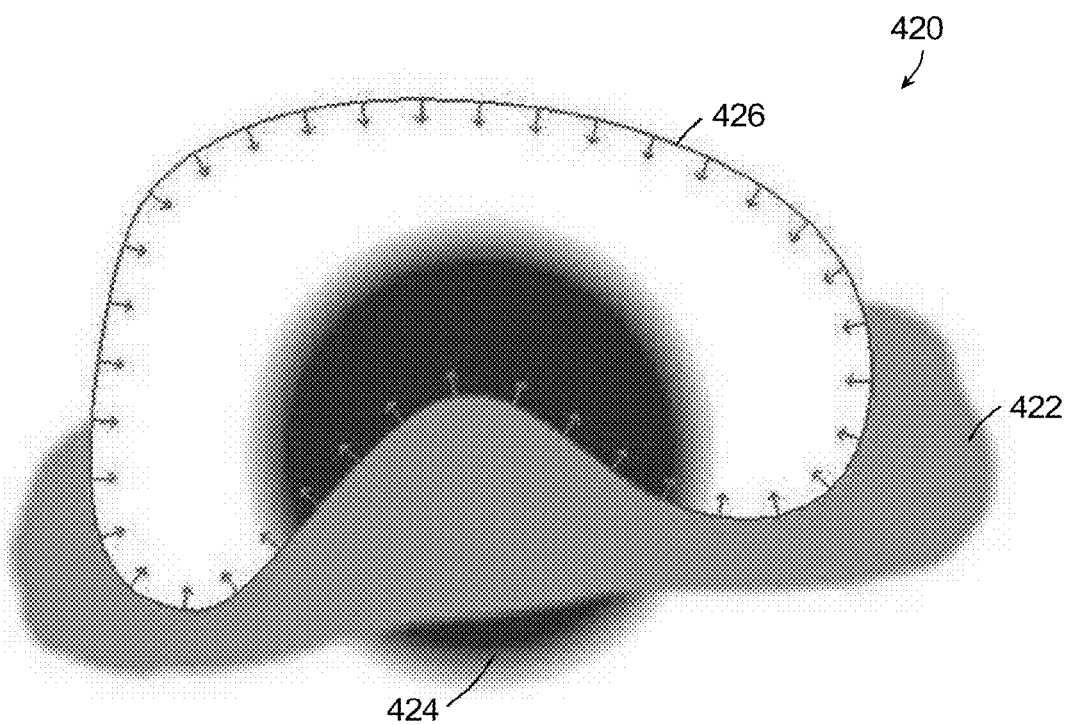
FIG. 4B is a schematic diagram illustrating the result of applying orange paint strokes over a circular blue stroke following activation of a 100% protection level stencil, according to an illustrative embodiment of the invention.

FIGS. 4A and 4B demonstrate an implementation of the stenciling methods illustrated in FIGS. 2 and 3. FIG. 4A is a schematic diagram 400 that shows an image resulting from the application of orange paint strokes 402 over a circular blue paint stroke 404 without a stencil. FIG. 4B shows the image 420 wherein a stencil 426, or mask, having a 100% protection level is active during the application of orange paint strokes 422 over a previously-painted circular blue paint stroke 424. Thus, the orange paint strokes 422 applied following activation of the 100% stencil do not affect the stenciled region 426 illustrated in FIG. 4B.

In terms of the steps of FIG. 3 and component references of FIG. 2, the implementation of the stenciling method in FIG. 4B begins with a protected image 204 containing the original blue circle 424. Then, as shown in step 302 of FIG. 3, a first texture is created by the user. In the implementation of FIG. 4B, the user "lassos," or otherwise defines the region shown inside the irregular shaped, closed boundary at reference 426, and specifies that the level of protection to be applied for all points within this region is 100%. Thus, this region is completely shielded, or masked, from subsequent paint strokes as long as the stencil remains active. The stenciling method of FIG. 3 is performed as the user applies the orange paint strokes 422 while viewing the display image 212. Finally, the user deactivates the stencil by providing a signal, such as a mouse click, a button release, or other signal. At this point, the display image, in a sense, becomes "permanent," since the modified second texture is blended into the protected image after having accumulated all the brush strokes performed while the stencil has remained active, and after having been modified according to the protection levels of the first texture.

Each brush stroke that is accumulated in the second texture may be represented, at least in part, by a scratch texture. A scratch texture indicates one or more intensity values of pixels (and/or texels) associated with each brush stroke. A scratch texture may be considered to be a "template" describing characteristics of a brush used to perform a brush stroke. For example, the brush may be assigned a certain width, a varying width along the length of a stroke, a certain shape characteristic of the end of the brush, and/or a "falloff" or transition region along a portion of the brush, such as along the edges of the brush. The intensity values in the scratch texture may be used to determine the intensity of a selected color at a given pixel within the brush stroke. For example, a scratch texture comprising values representing a given brush stroke may represent a "falloff" region of the brush stroke by assigning intensity values from 1 (full intensity) at the center, or near to the center, of the stroke, down to 0 (no intensity) at points at the edges of the stroke and beyond. Thus, a blended composite of the scratch texture with a paint texture containing a single monochromatic color value would portray a paint stroke with the most intense color at the center of the stroke, falling off to no color (zero intensity) at the edges of the stroke. As each brush stroke is added to the second texture, a compositing operation is performed to combine the most recent brush stroke into the accumulated brush strokes. Each of these brush strokes may be based on scratch textures. For example, each brush stroke may simply be represented by its corresponding scratch texture, where scratch texture intensity values are multiplied by a monochromatic color value.

Figure 5:
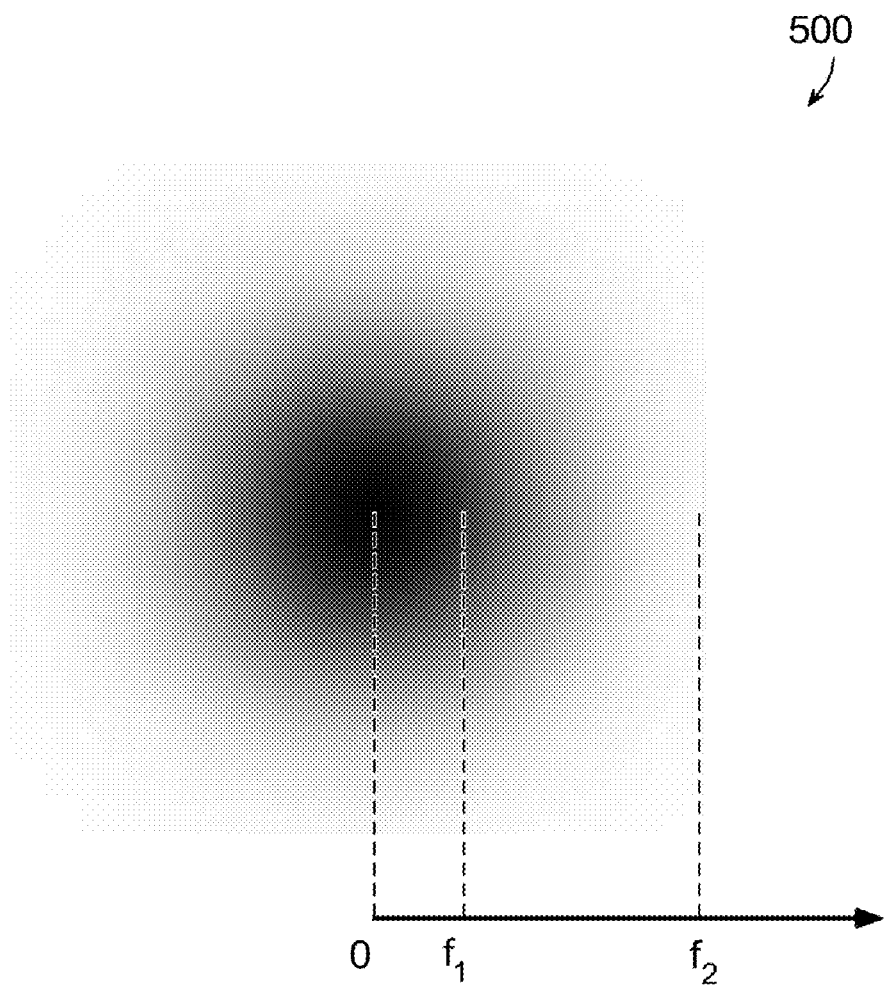
FIG. 5 is a schematic diagram showing pixel values of a scratch texture as grayscale intensity levels, where the scratch texture represents a paint stroke with a transition region, according to an illustrative embodiment of the invention.
Figure 6:
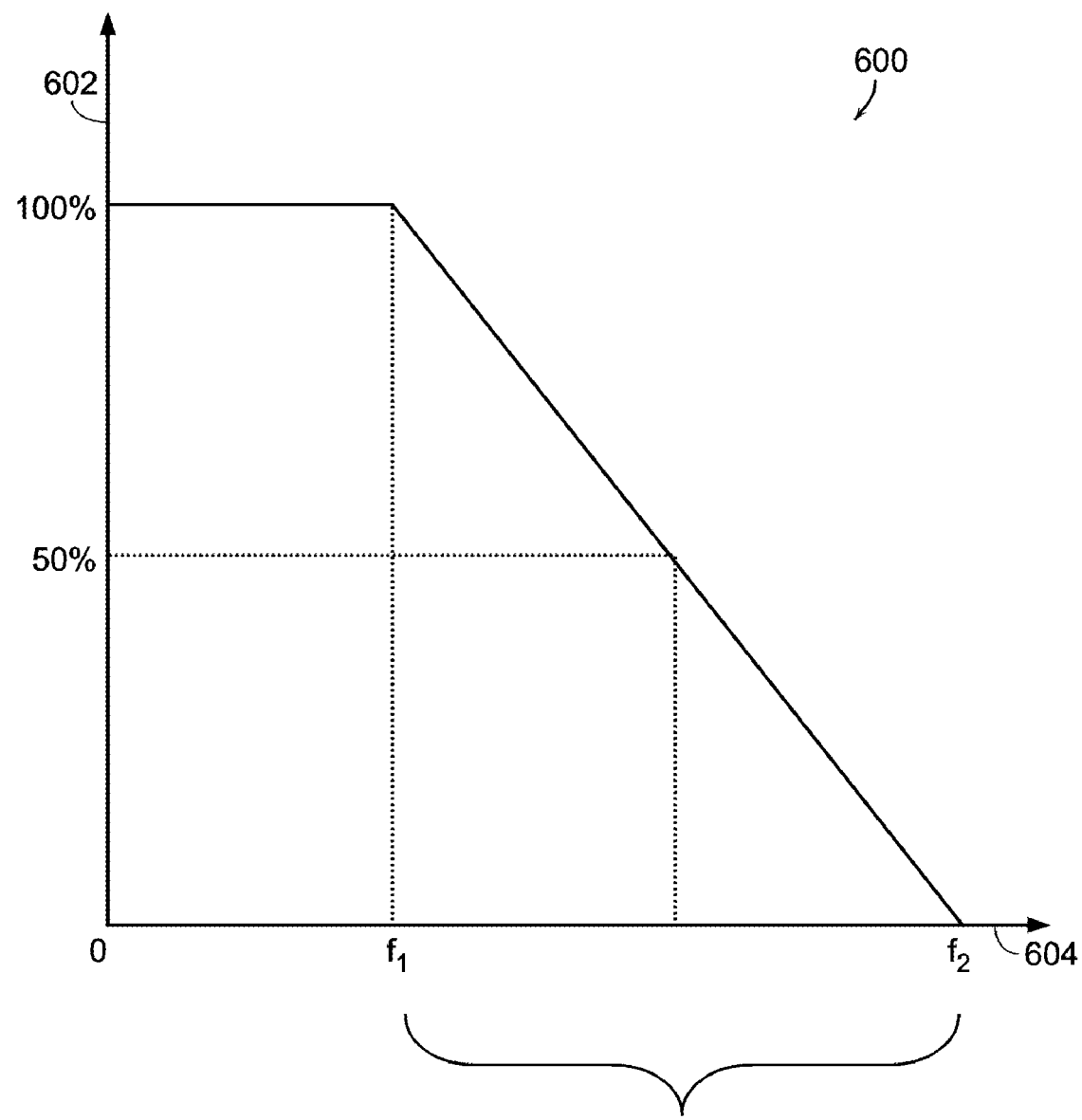
FIG. 6 shows a graph depicting the intensity levels of an illustrative brush stroke as a function of a distance from the center of the brush stroke, where the brush stroke has a transition region, and the intensity levels are contained in a scratch texture for the brush stroke, according to an illustrative embodiment of the invention.

FIG. 5 is a schematic diagram 500 portraying pixel values of a scratch texture as grayscale intensity levels, where the scratch texture represents a paint stroke with a transition, or falloff, region. The paint stroke 500 is centered at point 0, and the falloff region begins at a distance f1 from the center and extends to a distance f2 from the center. FIG. 6 shows a graph 600 depicting intensity level (y-axis, 602) of the scratch texture as a function of distance from the center 0 (x-axis, 604). Here, a linear falloff is depicted. The falloff region may, alternatively, be nonlinear.

Figure 7B:
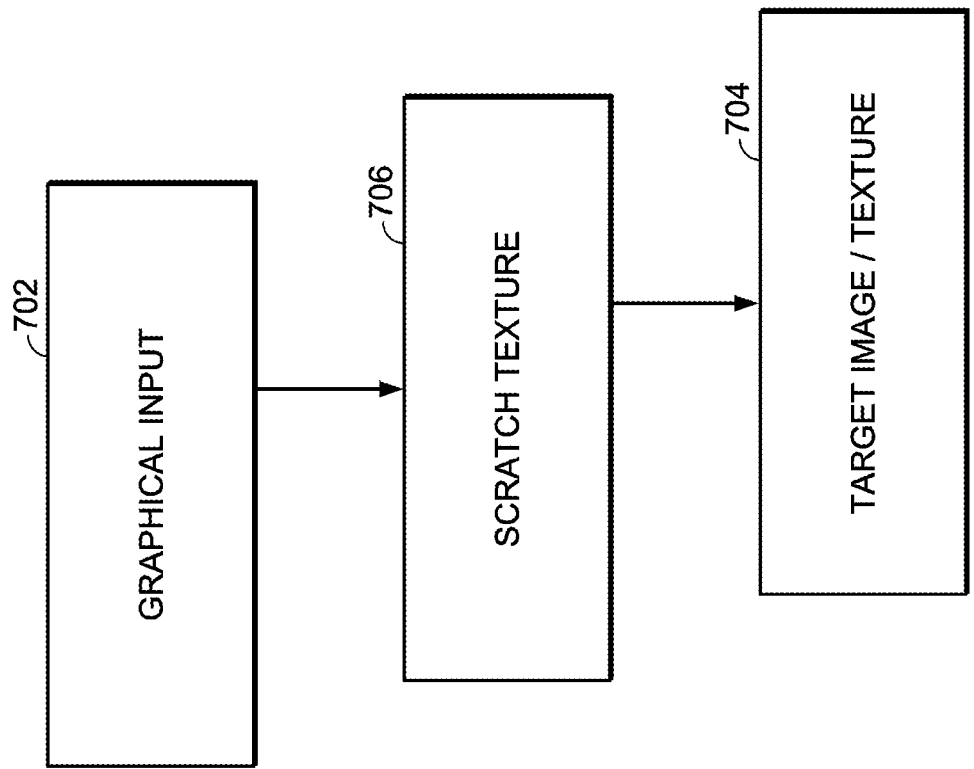
FIG. 7B is a block diagram featuring a method of blending graphical input into a target image using a scratch texture, according to an illustrative embodiment of the invention.
Figure 7A:
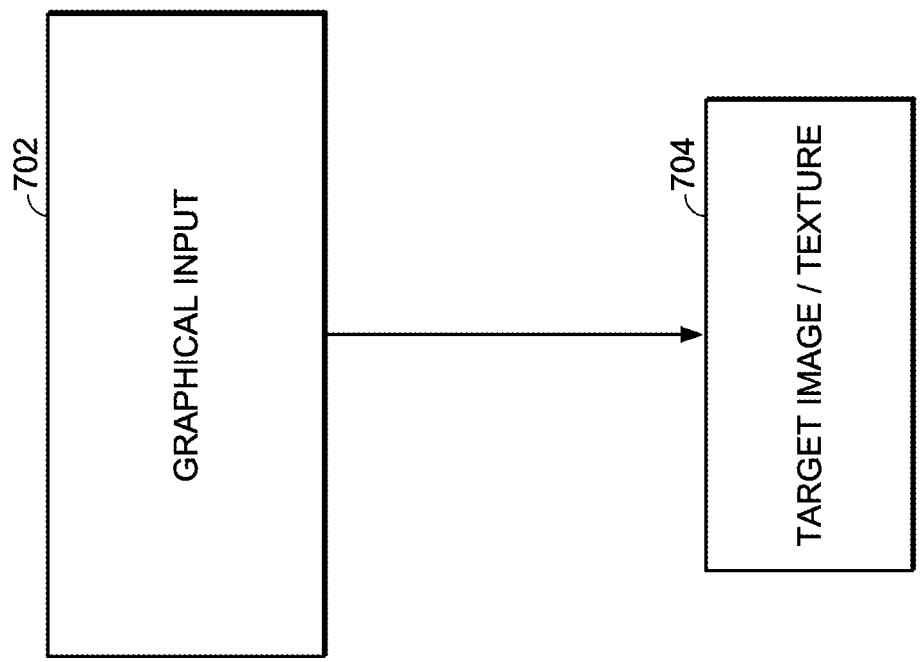
FIG. 7A is a block diagram featuring a method of blending graphical input into a target image without using a scratch texture, according to an illustrative embodiment of the invention.

FIGS. 7A and 7B show block diagrams 700, 720 that feature methods of blending graphical input 702 into any generic target image or texture 704—both with and without using scratch textures. An example of the target texture 704 is the second texture 208 in the method illustrated in FIG. 2. Graphical input 702 is based on the position of a graphical user interface at successive frames of time. An individual brush stroke is divided into a series of stroke segments that are separately blended into a scratch texture 706 as the stroke proceeds. The scratch texture 706 is then blended into the target image/texture 704.

Equations 1 through 5 show an illustrative blending algorithm used in the methods of the invention, where pixels are represented in RGBA format.

$$Ci = \text{overlay}(Ai, Bi): \quad (1)$$

$$Ci_r = Ai_r + (1 - Ai_a) * Bi_r \quad (2)$$

$$Ci_g = Ai_g + (1 - Ai_a) * Bi_g \quad (3)$$

$$Ci_b = Ai_b + (1 - Ai_a) * Bi_b \quad (4)$$

$$Ci_a = Ai_a + (1 - Ai_a) * Bi_a \quad (5)$$

where overlay(Ai, Bi) indicates an overlay compositing operation performed for corresponding pixels Ai and Bi of textures A and B using Equations 2-5; C is a composite of textures A and B; $Ai_r$, $Ai_g$, $Ai_b$, and $Ai_a$ are the red, green, blue, and alpha channels of pixel Ai, respectively; $Bi_r$, $Bi_g$, $Bi_b$, and $Bi_a$ are the red, green, blue, and alpha channels of pixel Bi, respectively; $Ci_r$, $Ci_g$, $Ci_b$, and $Ci_a$ are the red, green, blue, and alpha channels of pixel Ci, respectively; and the results of computations are clamped to the range [0,1].

The overlay function in Equation 1 may be used, in effect, to assign color to pixels of a scratch texture. Thus, for each pixel location of a scratch texture containing a paint stroke, and for a given paint color P, methods of the invention may blend an attenuated paint color on top of a color pixel in a target texture according to Equation 6:

$$T \leftarrow \text{overlay}(i*P, T) \quad (6)$$

where i is the intensity associated with the pixel location in the scratch texture, T on the right side of Equation 6 represents the current color pixel in the target texture (prior to blending), and the "T←" symbol represents writing the blended result into the target texture, replacing the current pixel value in the target texture.

The scratch texture may contain an erase stroke, and methods of the invention may blend an erase stroke into a target texture by attenuating existing target pixels according to Equation (7):

$$T \leftarrow (1-i)*T \quad (7)$$

The stenciling method illustrated in FIGS. 2 and 3 involves blending textures. For example, step 308 involves modifying values of the second texture 208 using the first texture 202, step 310 involves blending the second texture 208 into the display image 212, and step 312 involves blending the second texture 208 into the protected image 204. Moreover, the step of directing graphical input 206 into the second texture 208 may involve blending into the second texture 208 a scratch texture for each brush stroke performed while the stencil remains active.

In an embodiment of the invention where pixels are represented in RGBA format, the following is an example algorithm for performing the method illustrated in FIGS. 2 and 3 where the graphical input includes paint strokes each represented by a scratch texture. For each pixel location in the scratch texture:

(1) Blend the paint color P, attenuated according to the scratch texture, on top of the second texture at the current pixel location:

$$C \leftarrow \text{overlay}(i*P,C) \quad (8)$$

(2) Copy the protected image at the current pixel location into the display image:

$$D \leftarrow T \quad (9)$$

(3) Attenuate the second texture at the current pixel location according to the first texture, and blend it into the display image:

$$D \leftarrow \text{overlay}((1-s)*C,D) \quad (10)$$

where i is the intensity associated with the current pixel location in the scratch texture, s is the protection level associated with the current pixel location according to the first texture; C represents the pixel in the second texture corresponding to the current pixel location; T represents the pixel in the protected image corresponding to the current pixel location; and D represents the pixel in the display texture corresponding to the current pixel location.

A partial mask, or partial stencil, is applied in the case where the first texture contains protection level values less than 1 but greater than 0. The methods of FIGS. 2 and 3 allow a user to specify a first texture such that an initial version of a selected region of an image is maintained at a specified opacity in any subsequent composite, whether or not there are overlapping brush strokes applied while the stencil remains active. Various implementations of partial stenciling using the methods of FIGS. 2 and 3 are illustrated in FIGS. 8-10D.

Figure 8:
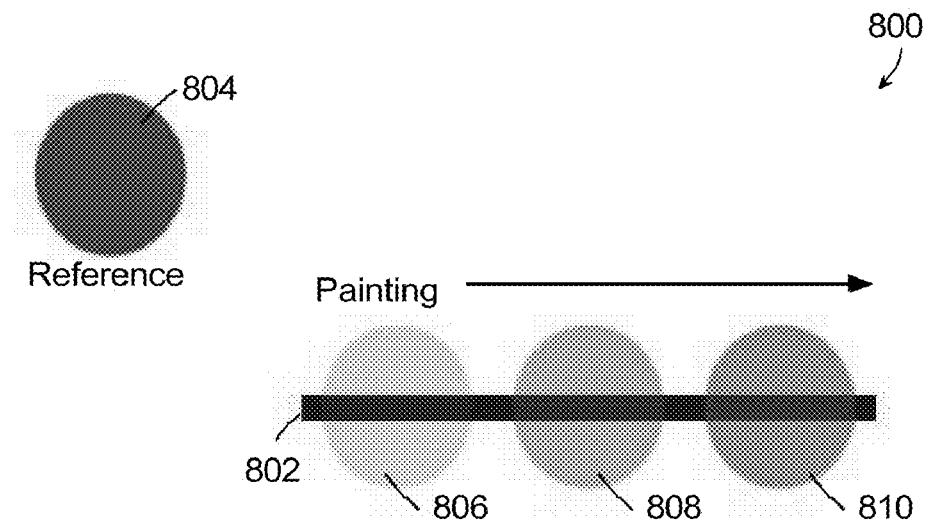
FIG. 8 is a schematic diagram demonstrating a buildup of color due to multiple overlapping paint strokes within a partially-masked region.

FIG. 8 is a schematic diagram 800 demonstrating the application of multiple, overlapping paint strokes in a region of an image protected by a method other than the method shown in FIGS. 2 and 3. In FIG. 8, the partial mask simply attenuates the color intensity of each individual paint stroke according to a user-designated level, without the use of an accumulating stencil texture. Here, the attenuation level is 75%; thus, the intensity of a brush stroke applied within the protected region is diminished to 25% of the value it would have if applied outside the protected region. A blue rectangular brush stroke 802 is shown for contrast. Each of the brush strokes applied in FIG. 8 has a size and shape as shown at reference 804, and each brush stroke is applied within a protected region of the image. Circle 806 shows the result of the application of one paint stroke following activation of the partial mask. Circle 808 shows the result of the application of two overlapping paint strokes following activation of the partial mask, and circle 810 shows the result of the application of three overlapping paint strokes following application of the partial mask. Circles 808 and 810 demonstrate the build up of color due to overlapping paint strokes. Although the partial mask has reduced the intensity of each paint stroke, individually, it has not limited the aggregate effect of the multiple, overlapping paint strokes.

Figure 9:
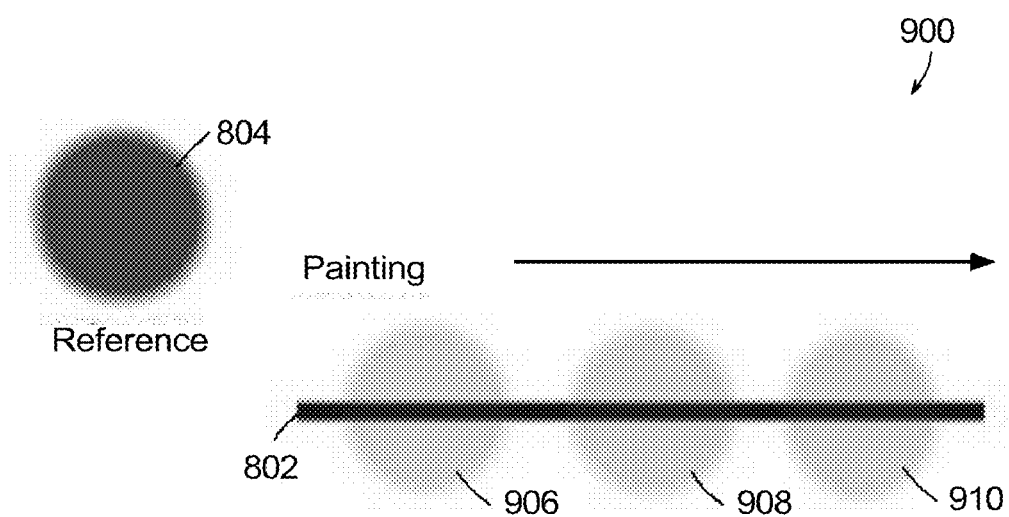
FIG. 9 is a schematic diagram demonstrating how an illustrative stenciling method of the invention prevents buildup of color due to multiple overlapping paint strokes within a partially-masked region.

FIG. 9 is a schematic diagram 900 that demonstrates how the stenciling method illustrated in FIGS. 2 and 3 prevents buildup of color caused by multiple, overlapping paint strokes within a partially-masked region. A blue rectangular paint stroke 802 is shown for contrast. Each of the paint strokes applied in FIG. 9 has a size and shape as shown at reference 804, and each brush stroke is applied within a protected region of the image. The protection level is 75%; thus, the change in the partially protected region is limited to 25%, as specified in the first texture, regardless of how many brush strokes are applied while the stencil is active. Circle 906 shows the result of the application of one paint stroke following activation of the partial mask. Circle 908 shows the result of the application of two overlapping paint strokes following activation of the partial mask, and circle 910 shows the result of the application of three overlapping paint strokes following activation of the partial mask. The change in the partially protected region is limited to the maximum specified by the first texture. This maximum change is reached after application of a single paint stroke, shown in circle 906; therefore, there is no difference between the color intensities of circles 906, 908, and 910.

Figure 10A:
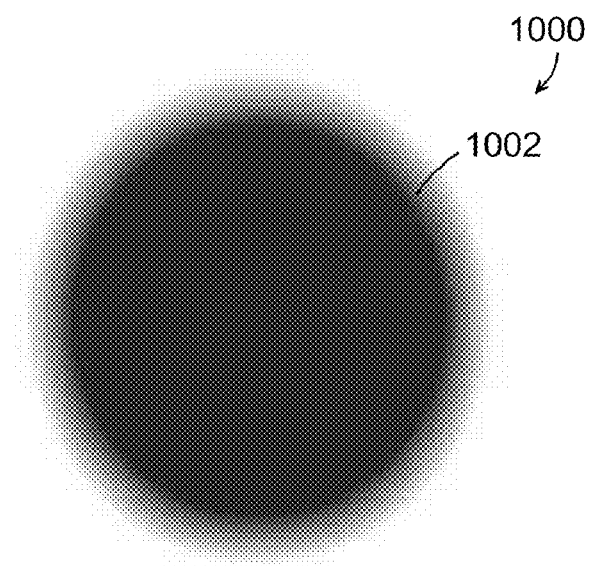
FIG. 10A is a schematic diagram illustrating a circular paint stroke having a blue color value, according to an illustrative embodiment of the invention.
Figure 10B:
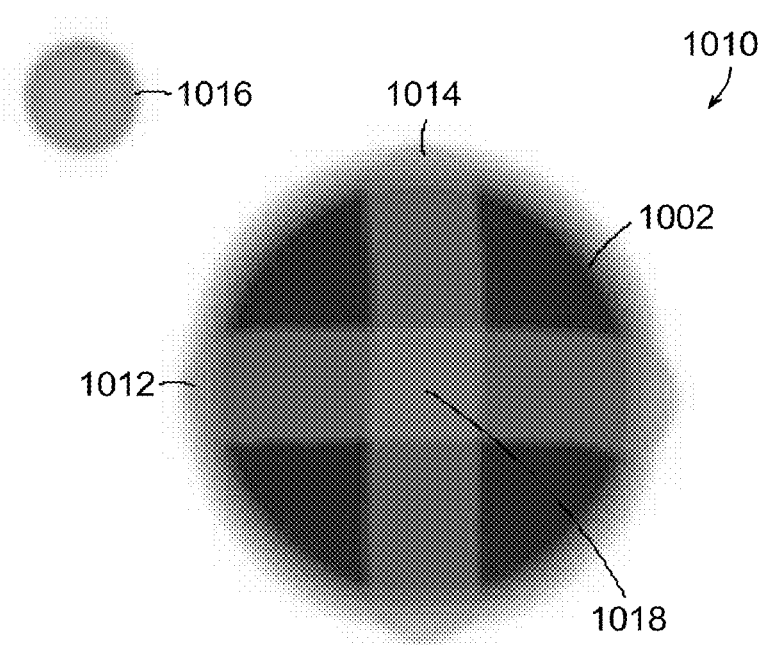
FIG. 10B is a schematic diagram illustrating the result of applying two overlapping orange paint strokes, each at 50% intensity, onto the circular blue paint stroke of FIG. 10A, without a stencil, according to an illustrative embodiment of the invention.

FIGS. 10A-10D further illustrate the effect of the application of partial stencils according to an embodiment of the invention. FIG. 10A is a schematic diagram 1000 illustrating a circular paint stroke 1002 having a blue color value. FIG. 10B is a schematic diagram 1010 illustrating the result of applying two overlapping orange paint strokes 1012, 1014, each at 50% intensity, onto the circular blue paint stroke 1002 without a stencil. The full intensity orange stroke 1016 is shown for reference. The orange intensity in the region where the two orange strokes overlap 1018 exceeds 50% of the reference 1016, a result that is expected since the two strokes 1012, 1014 are blended without modification by a stencil.

Figure 10C:
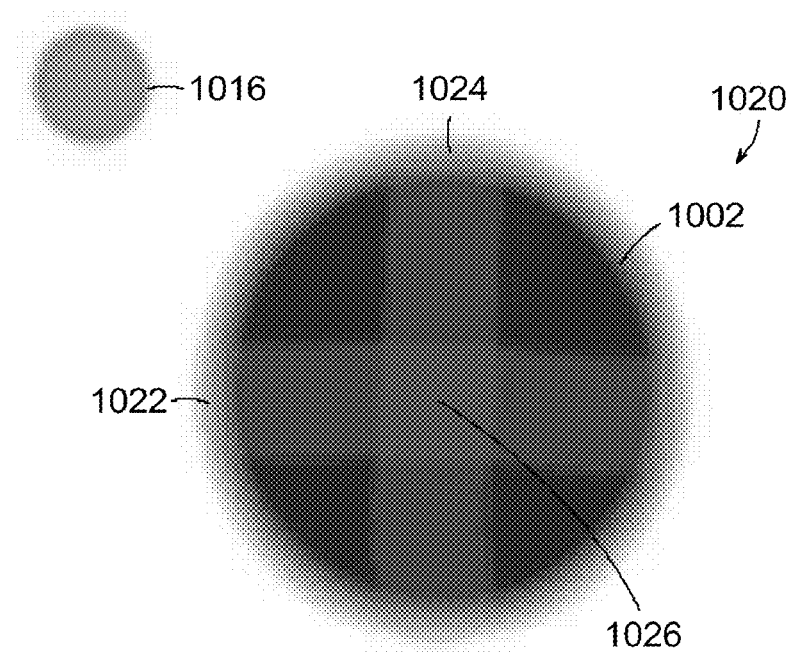
FIG. 10C is a schematic diagram illustrating the result of applying two overlapping orange paint strokes, each at 50% intensity, onto the circular blue paint stroke of FIG. 10A after activation of a 50% protection stencil over the entire circular region, according to an illustrative embodiment of the invention.
Figure 10D:
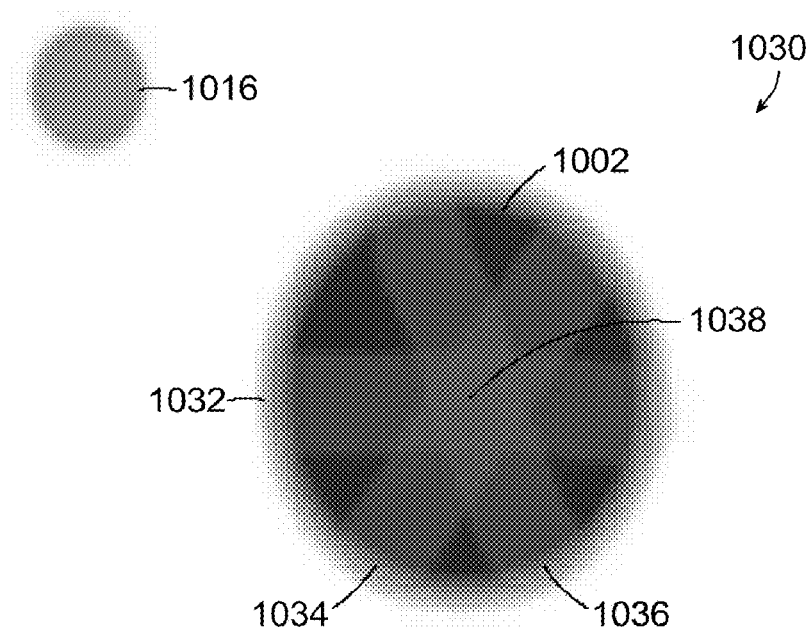
FIG. 10D is a schematic diagram illustrating the result of applying three overlapping orange paint strokes, each at 50% intensity, onto the circular blue brush stroke of FIG. 10A after activation of a 50% protection stencil over the entire circular region, according to an illustrative embodiment of the invention.

FIG. 10C is a schematic diagram 1020 illustrating the result of applying two overlapping orange paint strokes 1022, 1024, each at 50% intensity, onto the circular blue paint stroke 1002 following activation of a 50% protection stencil over the entire circular region. In FIG. 10C, the orange intensity in the overlap region 1026 is higher than in the region outside the overlap, but does not exceed the maximum 50% of full intensity 1016 imposed by the stencil. FIG. 10D is a schematic diagram 1030 illustrating the result of applying three overlapping orange paint strokes 1032, 1034, 1036, each at 50% full orange intensity, onto the circular blue brush stroke 1002 following activation of a 50% protection stencil over the entire circular region. As in FIG. 10C, the region of overlap 1038 of the three orange paint strokes does not exceed the maximum 50% of full intensity 1016 limit imposed by the stencil. In this way, FIGS. 10A-10D demonstrate that the invention may be used to partially stencil an object while still allowing overlapping paint strokes to build in intensity, up to a specified maximum.

The graphical input directed in the second texture following activation of a stencil may contain erase strokes. Realtime display of erase strokes requires modification of paint strokes applied both before and after activation of the stencil. Since the second texture contains data from paint strokes applied after activation of the stencil, but not before, a method of the invention includes the step of modifying the pixels of the protected image prior to copying pixels of the protected image into the display image and compositing the modified second texture pixels with the display image pixels.

Figure 11:
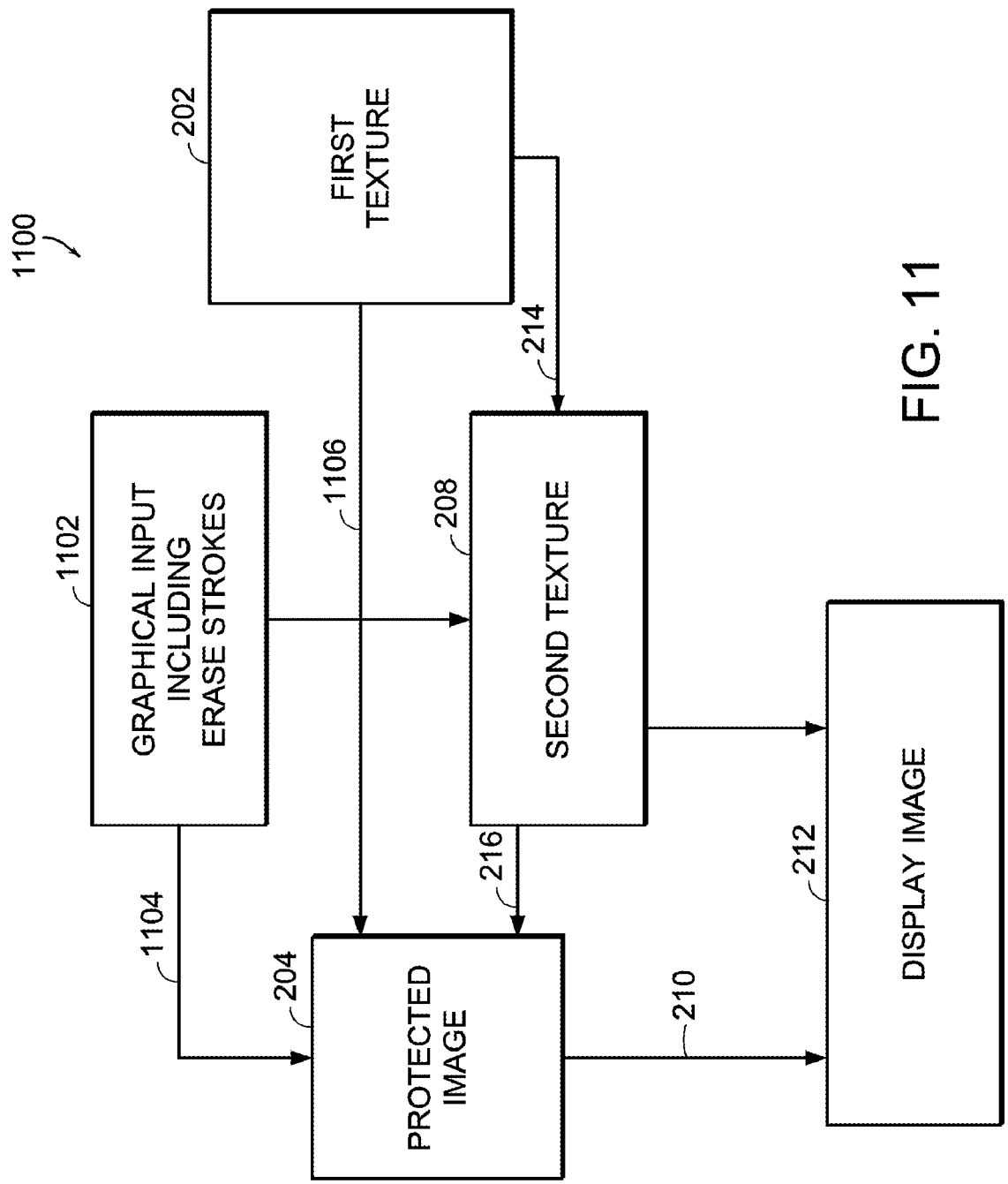
FIG. 11 is a schematic diagram illustrating a method for blending erase strokes into an image while wholly or partially protecting one or more selected regions of the image from edits, according to an illustrative embodiment of the invention.

Accordingly, FIG. 11 is a schematic diagram 1100 illustrating a method for blending graphical input 1102 into an image 204 while a full or partial stencil is active, where the graphical input 1102 includes erase strokes. The method illustrated in FIG. 11 is further described in the block diagram 1200 of FIG. 12.

Figure 12:
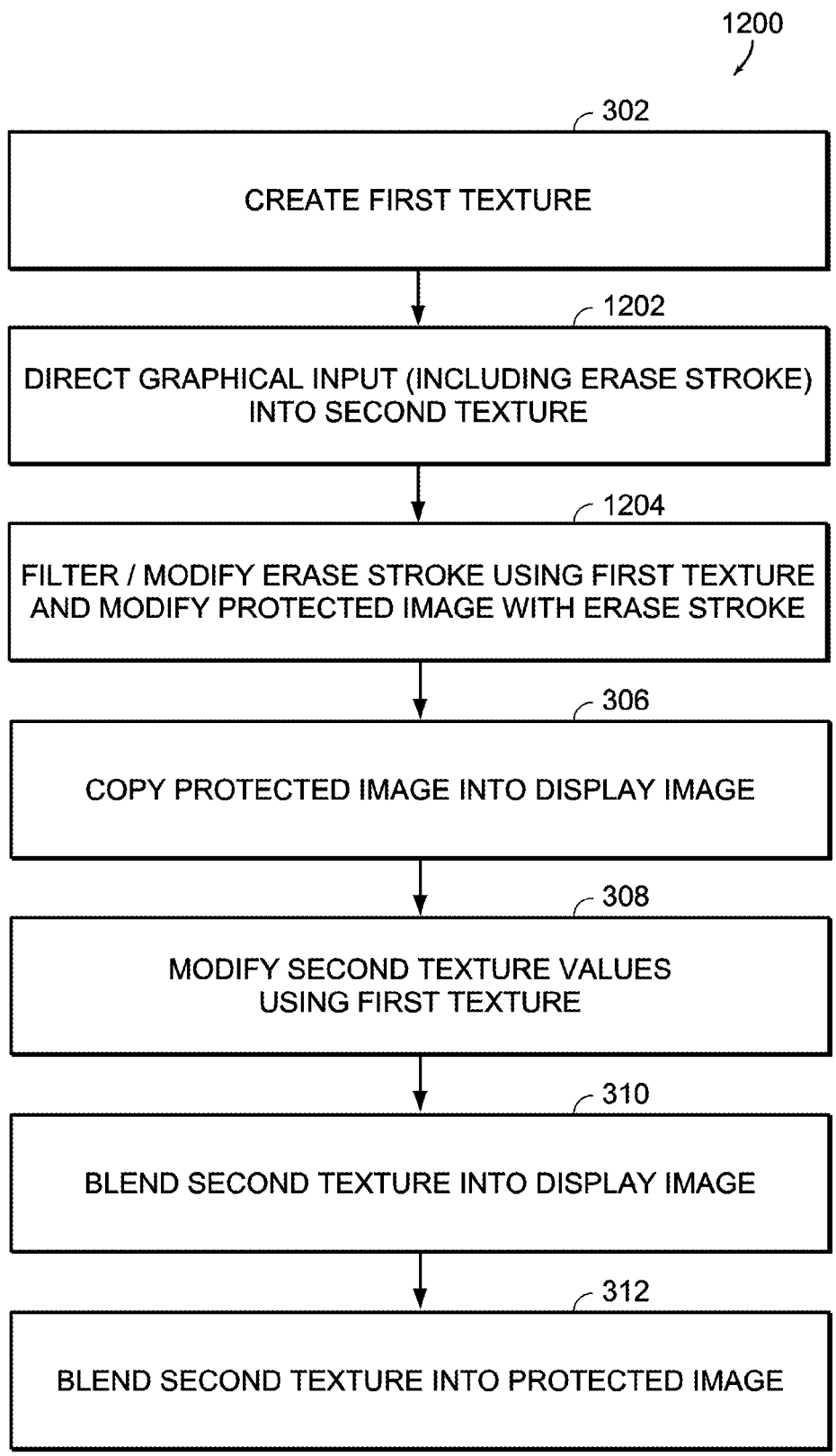
FIG. 12 is a block diagram featuring the stenciling method illustrated in FIG. 11, according to an illustrative embodiment of the invention.

In step 302 of FIG. 12, the method creates a first texture based on user input. The first texture is illustrated at reference 202 of FIG. 11. In step 1202 of FIG. 12, the stenciling method redirects graphical input, including one or more erase strokes, into a second texture 208. Accordingly, FIG. 11 shows graphical input 1102 that is directed into the second texture 208. Unlike the method described in FIGS. 2 and 3, the protected image 204 in FIG. 11 is modified by the erase strokes while the stencil is still active. This is shown in step 1204 of FIG. 12 and is indicated by arrow 1104 in FIG. 11. However, each erase stroke is filtered by the first texture before it modifies the protected image 204, so that the protection of stenciled regions is maintained. This is indicated by arrow 1106 in FIG. 11. The remainder of the process is as described in conjunction with FIGS. 2 and 3, following steps 306, 308, 310, and 312 of FIG. 12.

In an embodiment of the invention where pixels are represented in RGBA format, the following is an example algorithm for performing the method illustrated in FIGS. 11 and 12 for an erase stroke represented by a scratch texture. For each pixel location in the scratch texture:

(1) Attenuate C at the current pixel location according to the scratch texture:

$$C \leftarrow (1-i)*C \quad (11)$$

(2) If the alpha value of the protected image at the current pixel location is greater than the protection level at the current pixel location specified by the first texture (If Ta>s), attenuate the protected image at the current pixel location down to a minimum of s:

$$T \leftarrow \max(1-i, s/Ta)*T \quad (12)$$

(3) Attenuate the second texture at the current pixel location according to the first texture, and blend it into the display image:

$$D \leftarrow \text{overlay}((1-s)*C, D) \quad (13)$$

where i is the intensity associated with the current pixel location in the scratch texture, s is the protection level associated with the current pixel location according to the first texture; C represents the pixel in the second texture corresponding to the current pixel location; T represents the pixel in the protected image corresponding to the current pixel location; and D represents the pixel in the display texture corresponding to the current pixel location.

Figure 13:
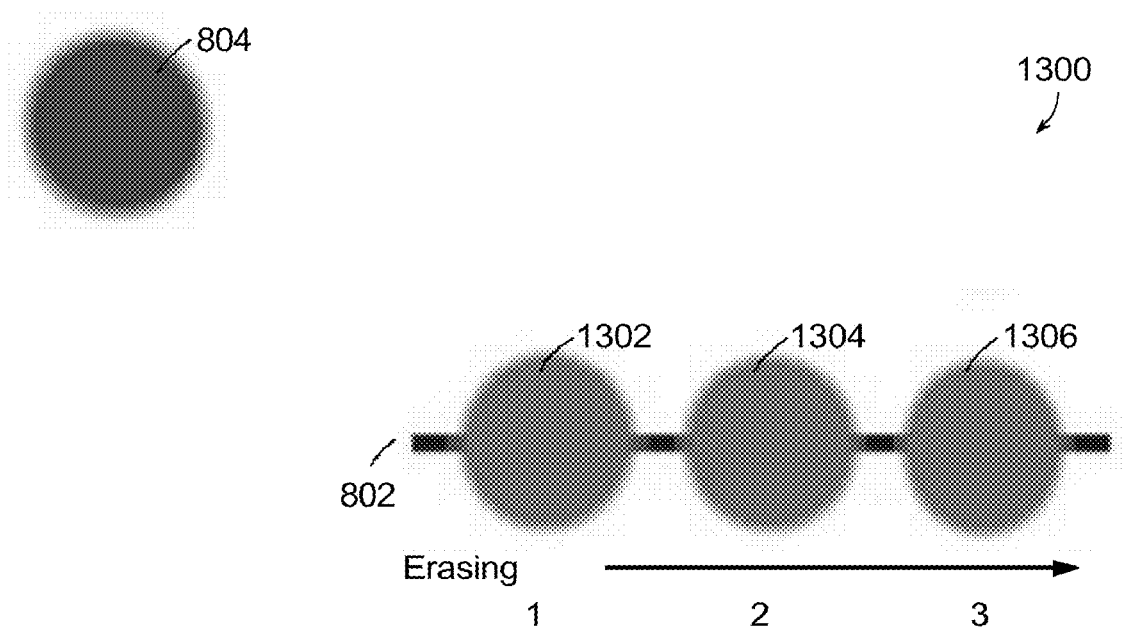
FIG. 13 is a schematic diagram demonstrating a removal of color due to multiple overlapping erase strokes within a partially-masked region.
Figure 14:
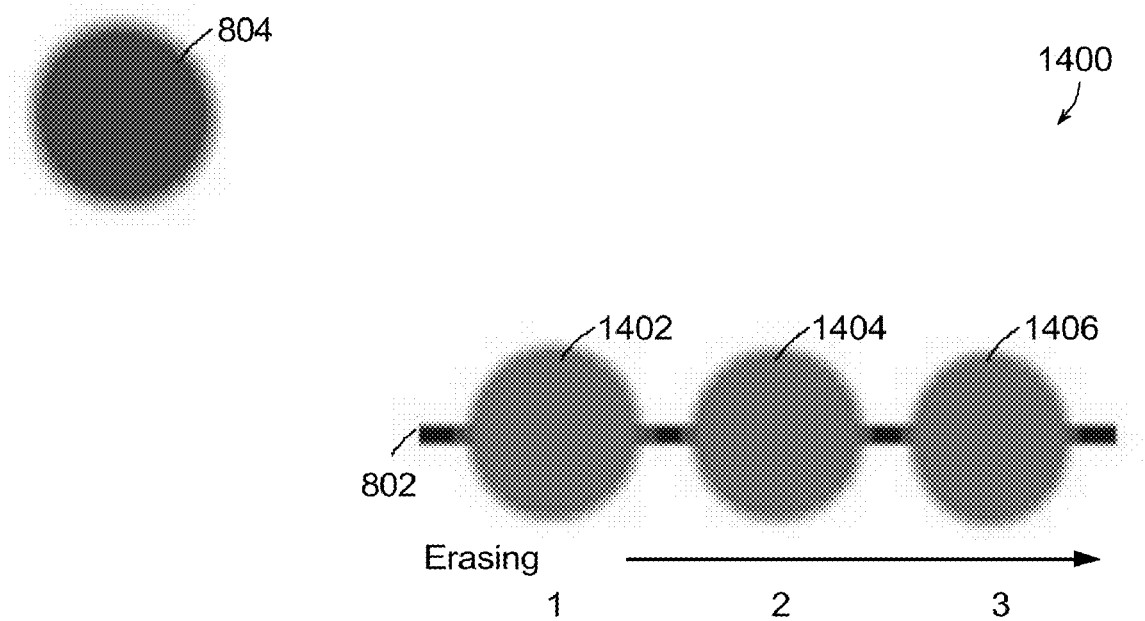
FIG. 14 is a schematic diagram demonstrating how an illustrative stenciling method of the invention prevents removal of color due to multiple overlapping erase strokes within a partially-masked region.
Figure 15:
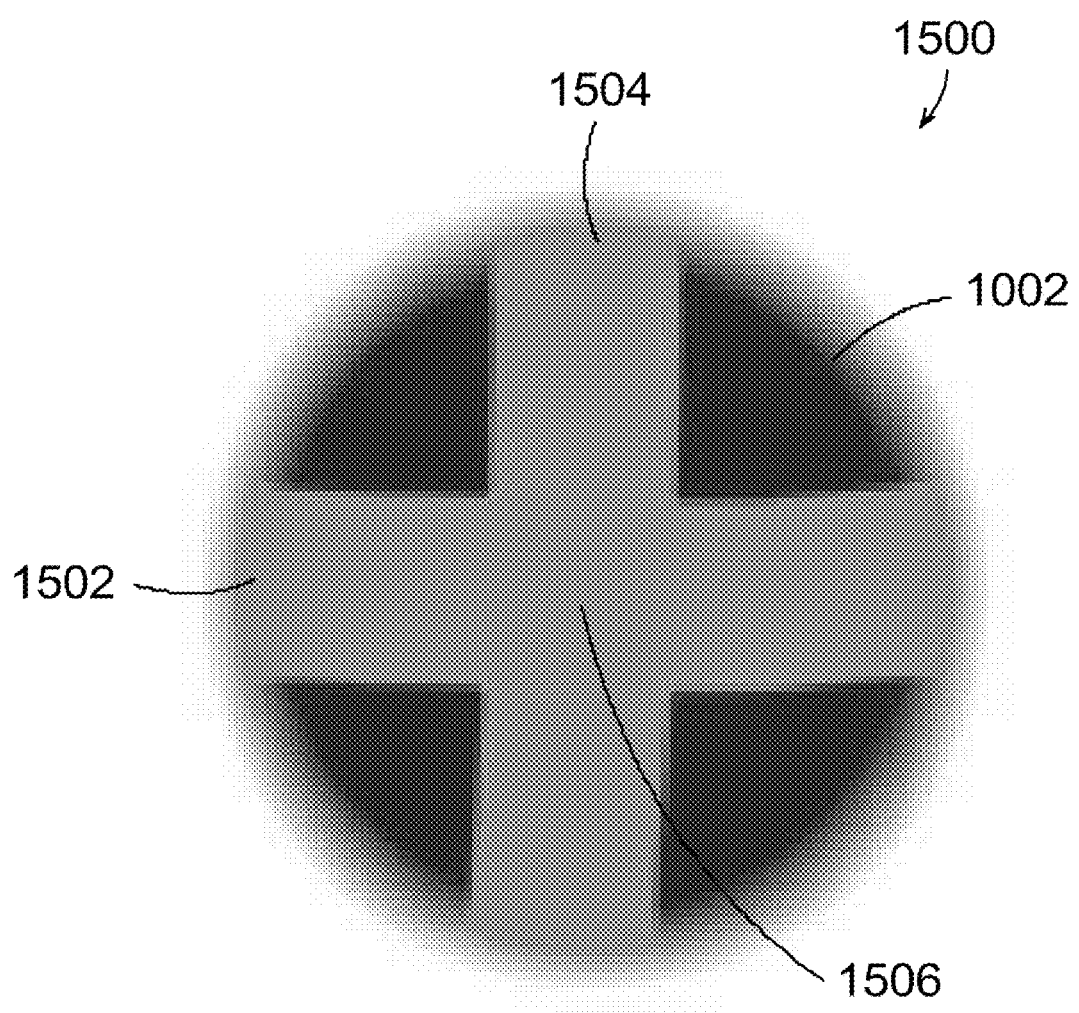
FIG. 15 is a schematic diagram illustrating the result of applying two overlapping erase strokes, each at full intensity, onto a circular blue paint stroke after activation of a 50% protection stencil over the entire circular region, according to an illustrative embodiment of the invention.

Various implementations of partial stenciling during the application of erase strokes using the methods of FIGS. 11 and 12 are illustrated in FIGS. 13-15. FIG. 13 is a schematic diagram demonstrating a removal of color by multiple, overlapping erase strokes within a region of an image protected by a method other than the method shown in FIGS. 11 and 12. In FIG. 13, the mask simply scales each erase stroke according to a user-designated level. Here, the "protection" level is 75%, thus, the effect of each erase stroke is reduced by 75% before application. A blue rectangular brush stroke 802 is shown for contrast. Each of the erase strokes applied in FIG. 13 has a size and shape as shown at reference 804, and each erase stroke is applied within a protected region of the image. Circle 1302 shows the result of the application of one erase stroke over the reference 804, following activation of the partial mask. Circle 1304 shows the result of the application of two erase strokes over the reference 804, following activation of the partial mask. Circle 1306 shows the result of the application of three erase strokes over the reference 804, following activation of the partial mask. With each successive erase stroke, the color is further attenuated. Although the partial mask has limited the effect of each erase stroke individually, it has not limited the aggregate effect of multiple, overlapping erase strokes.

FIG. 14 is a schematic diagram 1400 that demonstrates how the stenciling method illustrated in FIGS. 11 and 12 prevents removal of color due to multiple overlapping erase strokes within a partially-masked region. Each erase stroke is applied within a protected region. The protection level specified by the first texture over the protected region is 75%. Circle 1402 shows the result of the application of one erase stroke over the reference 804 following activation of the partial mask. Circle 1404 shows the result of the application of two erase strokes over the reference 804 following application of the partial mask, and circle 1406 shows the result of the application of three erase strokes over the reference 804 following application of the partial mask. Here, the attenuation is limited to the amount specified by the partial mask. Multiple erase strokes do not cause the attenuation to exceed the amount specified by the partial mask. As in the case of painting, this result serves the needs of users who wish to use a partial mask to specify a maximum extent to which an image is allowed to change in selected, stenciled regions.

FIG. 15 is a schematic diagram 1500 illustrating the result of applying two overlapping erase strokes 1502, 1504, each at full intensity, onto a circular blue paint stroke 1002 following activation of a 50% stencil over the entire circular region. The intensity of the underlying blue paint stroke 1002 is not attenuated below the 50% limit imposed by the stencil, even in the overlapping region 1506, despite the fact that two erase strokes have been applied to this region.

Figure 16A:
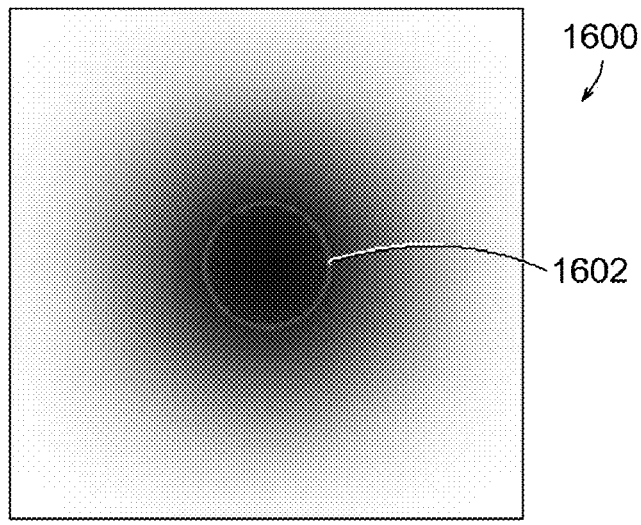
FIG. 16A is a schematic diagram illustrating the application of a single paint stroke across an image following activation of a partial mask along the edges of a full mask, where the partial mask provides a smooth transition between masked and unmasked portions of the stenciled image.
Figure 16B:
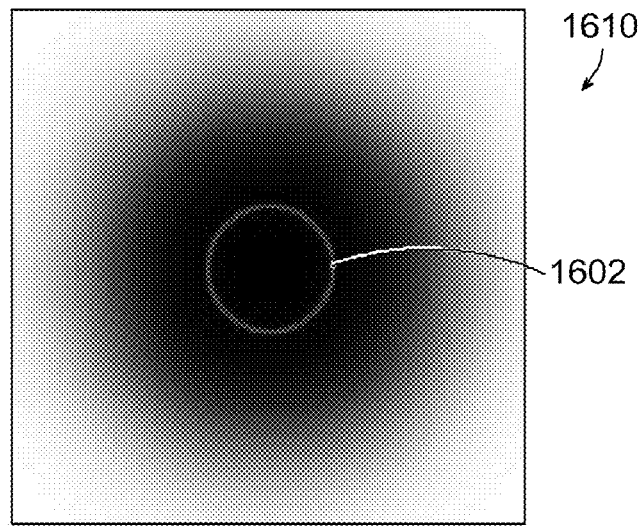
FIG. 16B is a schematic diagram illustrating the buildup of color within the partially protected region of the image of FIG. 16A following application of three overlapping paint strokes across the entire image.
Figure 16C:
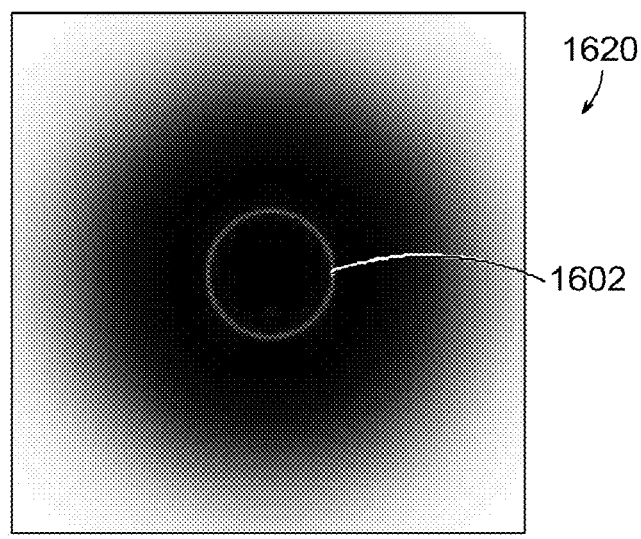
FIG. 16C is a schematic diagram illustrating the further buildup of color within the partially protected region of the image of FIG. 16A following application of five overlapping paint strokes across the entire image.

A partial mask may be used along the edges of a full mask in order to provide a smooth transition between masked and unmasked portions of a stenciled image. FIG. 16A is a schematic diagram 1600 illustrating the application of a single paint stroke (100% black) across an image following activation of a partial mask. The partial mask is applied as a feathering function along the edges of a full mask, indicated by the red circle 1602, not in accordance with the partial stenciling methods of FIGS. 2 and 3. As discussed with respect to FIG. 8, the partial mask shown attenuates the color intensity of each individual paint stroke according to a user-designated level without the use of an accumulating stencil texture. FIG. 16B is a schematic diagram 1610 illustrating the buildup of color within the partially protected region following application of three overlapping paint strokes (100% black) across the entire image, and FIG. 16C 1620 illustrates the buildup of color within the partially protected region following application of five overlapping paint strokes (100% black) across the entire image. In contrast to the method above, applying a partial stencil according to the method of FIGS. 2 and 3 results in no buildup of color within a partially protected region following application of multiple overlapping paint strokes within the partially protected region.

According to an embodiment of the invention, an individual brush stroke is divided into a series of stroke segments that are separately blended into a scratch texture. The invention provides a method that prevents double-blending of overlapping portions of segments of the individual brush stroke, thereby avoiding undesired artifacts at the segment ends.

Figure 17:
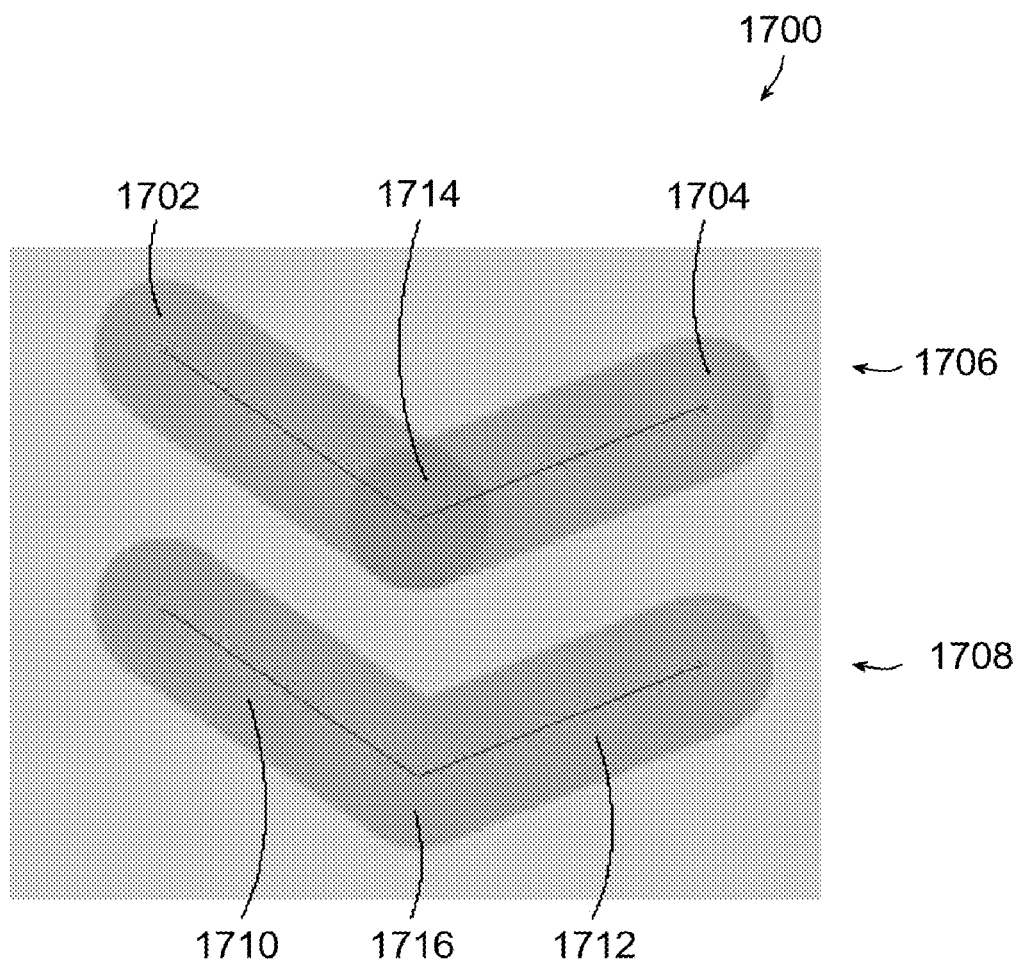
FIG. 17 is a schematic diagram showing two contiguous pillbox segments of a brush stroke both with and without a double-blending artifact in the overlapping portion, according to an illustrative embodiment of the invention.

FIG. 17 is a schematic diagram 1700 showing two contiguous pillbox segments 1702, 1704 of a brush stroke. FIG. 17 shows the two segments of the brush stroke both with 1706 and without 1708 a double-blending artifact in the overlapping portion. Each segment of the brush stroke is represented using a pillbox shape. Brush stroke 1706 is divided into two segments 1702 and 1704, and brush stroke 1708 is divided into two segments 1710 and 1712. The overlapping portion of the two segments in brush stroke 1706 results in higher intensities in the circular region 1714. The blending method performed for brush stroke 1708 avoids the higher intensities in the region 1716 where the ends of the pillboxes overlap, resulting in a brush stroke of even intensity.

Figure 18:
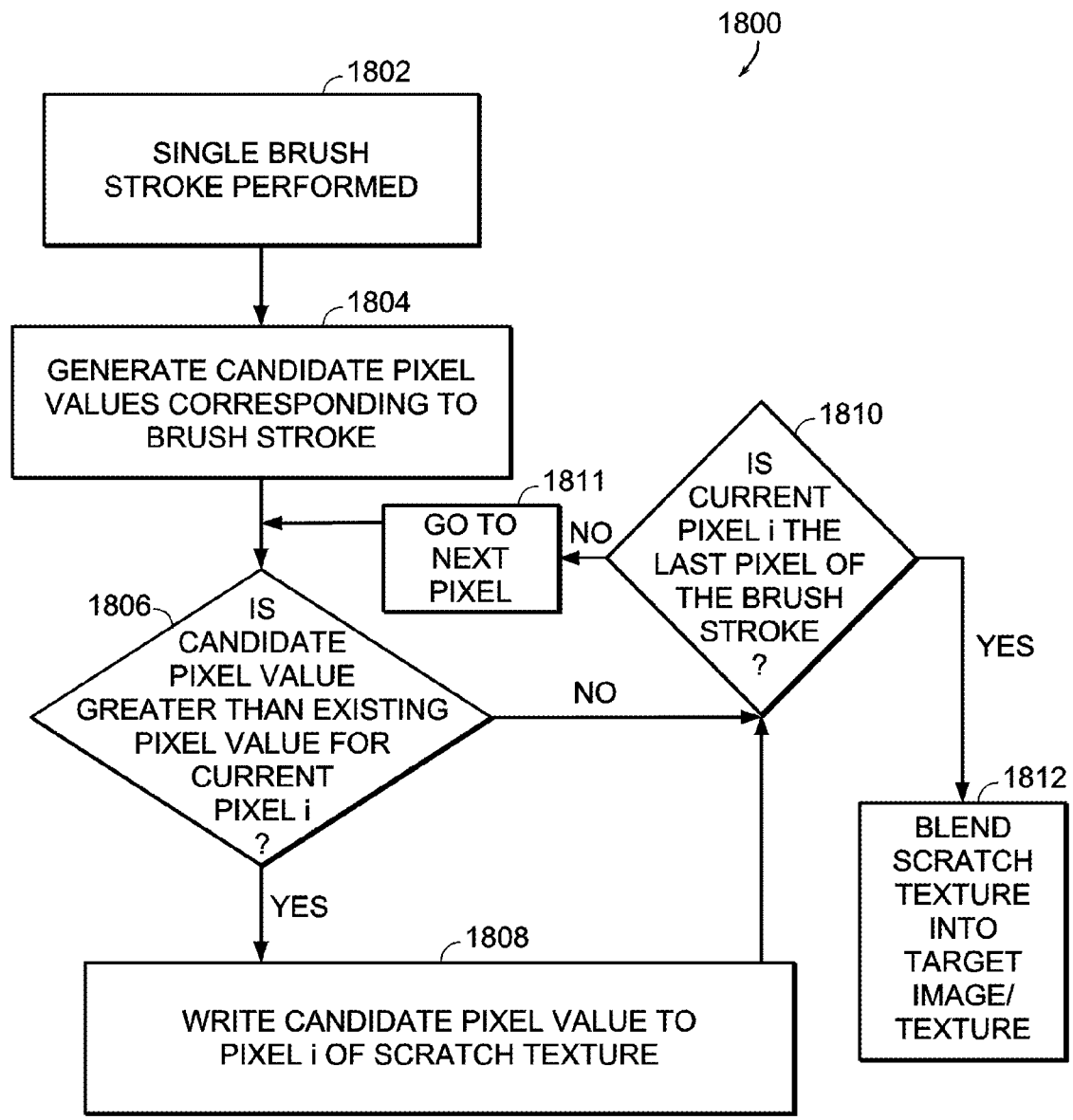
FIG. 18 is a block diagram featuring a method of blending a scratch texture containing a single brush stroke into a target image, according to an illustrative embodiment of the invention.

The blending method uses a scratch texture to describe the size and shape of the brush. By assigning a new pixel value to the scratch texture only if it exceeds the existing value at that pixel, the double-blending artifact is avoided. FIG. 18 is a block diagram 1800 featuring a method of blending a scratch texture containing a single brush stroke into a target image or texture. Step 1802 indicates the performance of a single brush stroke by a user. In step 1804, candidate pixel values are generated corresponding to the brush stroke. In step 1806 it is determined for a candidate pixel value whether the candidate value is greater than the existing pixel value in the target image/texture. If so, step 1808 writes the candidate pixel value into the pixel of the scratch texture, and step 1810 and 1811 proceed through the remaining candidate pixels. The blending step 1812 is performed substantially upon completion of the performance of the paint stroke by the user.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of blending erase strokes into an image while at least partially protecting a selected region of an image from subsequent editing, the method comprising the steps of:
    (a) creating a first texture comprising a plurality of pixels each with an assigned scalar value indicating a level of protection for a corresponding pixel of a protected image;
    (b) following a first user signal, directing graphical input representing at least one erase stroke performed by the user into a second texture, wherein the protected image is at least initially unedited by the graphical input;
    (c) modifying a value of the at least one erase stroke using the first texture;
    (d) modifying a value of at least one pixel of the protected image using the modified erase stroke;
    (e) following a second user signal subsequent to the first user signal, blending at least one pixel of the second texture into the protected image; and
    (f) displaying an image based on the result of step (e).

2. The method of claim 1, further comprising the step of:
    (i) modifying a value of at least one pixel of the second texture using the first texture.

3. The method of claim 1, further comprising the steps of:
    (i) copying at least one pixel of the protected image into a display image; and
    (ii) blending at least one pixel of the second texture into the display image.

4. The method of claim 1, wherein the graphical input represents a plurality of erase strokes performed by the user.

5. The method of claim 4, wherein the plurality of erase strokes comprises at least one overlapping portion.

6. The method of claim 5, wherein the at least one overlapping portion corresponds to an area overlapped by a plurality of brush strokes.

7. The method of claim 1, further comprising the step of generating the graphical input of step (b), wherein the graphical input corresponds to a movement of a user.

8. The method of claim 1, wherein the first user signal is a button click.

9. The method of claim 1, wherein the first texture represents at least one user-selected region of the image.

10. The method of claim 1, wherein the erase stroke is represented by a scratch texture.

11. The method of claim 10, wherein step (c) comprises attenuating a value of a pixel n the protected image subject to a minimum RGBα alpha value, where the minimum alpha value is determined using the first texture.

* * * * *